(12) United States Patent
West et al.

(10) Patent No.: US 8,054,413 B2
(45) Date of Patent: Nov. 8, 2011

(54) STRESSED LIQUID CRYSTALS MATERIALS FOR LIGHT MODULATION

(75) Inventors: John L. West, Hartville, OH (US); Anatoliy Glushchenko, Colorado Springs, CO (US); Guoqiang Zhang, Bloomington, IN (US)

(73) Assignee: Kent State University, Kent, OH (US)

( * ) Notice: Subject to any disclaimer, the term of this patent is extended or adjusted under 35 U.S.C. 154(b) by 0 days.

(21) Appl. No.: 12/559,872

(22) Filed: Sep. 15, 2009

(65) Prior Publication Data

US 2010/0115764 A1   May 13, 2010

Related U.S. Application Data

(60) Division of application No. 11/299,993, filed on Dec. 12, 2005, now Pat. No. 7,595,850, which is a continuation-in-part of application No. 10/365,322, filed on Feb. 11, 2003, now Pat. No. 7,034,907.

(60) Provisional application No. 60/635,428, filed on Dec. 10, 2004.

(51) Int. Cl.
   *G02F 1/1333* (2006.01)
   *G02F 1/13* (2006.01)
(52) U.S. Cl. .............................. 349/86; 349/89; 349/187
(58) Field of Classification Search ................... 349/86, 349/89, 187
See application file for complete search history.

(56) References Cited

U.S. PATENT DOCUMENTS

| 4,685,771 | A | 8/1987 | West et al. |
| 4,890,902 | A | 1/1990 | Doane et al. |
| 4,994,204 | A | 2/1991 | Doane et al. |
| 5,812,227 | A | 9/1998 | Toshida et al. |
| 6,104,448 | A | 8/2000 | Doane et al. |

(Continued)

FOREIGN PATENT DOCUMENTS

JP            04-097225            3/1992

OTHER PUBLICATIONS

Wu et al., Molecular Cryst. Liq. Cryst.-High Speed Nematic Liquid Crystal Modulators, 1991, vol. 207, pp. 1-15.

*Primary Examiner* — Nathanael R Briggs
(74) *Attorney, Agent, or Firm* — Scott M. Oldham, Esq.; Hahn Loeser + Parks LLP

(57) ABSTRACT

A new light modulating material using interconnected unidirectionally oriented microdomains of a liquid crystal, dispersed in a stressed polymer structure, is provided. The light modulating material is prepared by dissolving the liquid crystal in an uncured monomer and then curing the monomer so that the polymer forms a well-developed interpenetrating structure of polymer chains or sheets that is uniformly dispersed through the film. When the film is subjected to stress deformation the liquid crystal undergoes a change in its unidirectional orientation. The concentration of the polymer is high enough to hold the shear stress, but is as low as possible to provide the highest switch of the phase retardation when an electric field is applied. The new materials are optically transparent and provide phase modulation of the incident light opposed to the low driving voltage, linear electro-optical response, and absence of hysteresis. It has been shown that these new materials may be successfully used in display applications, optical modulator, and beam steering devices.

26 Claims, 24 Drawing Sheets

U.S. PATENT DOCUMENTS

| | | |
|---|---|---|
| 6,414,728 B1 * | 7/2002 | Faris et al. ............... 349/10 |
| 6,618,114 B1 | 9/2003 | Freeman |
| 7,008,675 B2 * | 3/2006 | Kornfield et al. .......... 428/1.1 |
| 2002/0130989 A1 | 9/2002 | Nakao et al. |
| 2002/0159013 A1 | 10/2002 | Faris et al. |
| 2003/0039770 A1 * | 2/2003 | Sato et al. ............... 428/1.3 |
| 2005/0244589 A1 | 11/2005 | Kornfield et al. |

* cited by examiner

STRESSED LIQUID CRYSTALS MATERIALS FOR LIGHT MODULATION

CROSS REFERENCE TO RELATED APPLICATIONS

This application is a divisional of U.S. patent application Ser. No. 11/299,993 filed Dec. 12, 2005, which is a continuation-in-part of U.S. patent application Ser. No. 10/365,322 filed Feb. 22, 2003, now U.S. Pat. No. 7,034,907 issued on Apr. 25, 2006 hereby incorporated by reference. U.S. Pat. No. 7,034,907 is incorporated herein by reference in its entirety. This application also claims the benefit of U.S. Provisional Application Ser. No. 60/635,428 filed Dec. 10, 2004, hereby incorporated by reference.

GOVERNMENT RIGHTS

The United States Government has a paid-up license in this invention and may have the right in limited circumstances to require the patent owner to license others on reasonable terms as provided for by the terms of Grant No. 444226, awarded by the Defense Advanced Research Projects Agency (DARPA).

TECHNICAL FIELD

This invention relates generally to the technology of liquid crystal optical elements and, more specifically, to the manufacture of new material comprising a well developed stressed polymer structure that unidirectionally orients microdomains of liquid crystals. The new materials are characterized by ease of formation and the capability to switch large phase retardation within a short time by a low driving voltage.

BACKGROUND OF THE INVENTION

Light modulators operating at fast frame rates (kilohertz or faster) are in great demand for optical data processing and adaptive optics applications as well as for color projection displays using a time sequential color scheme. Much progress has been made in the last thirty years in developing optical switches or modulators, but current devices are unsatisfactory for many applications. For instance, the majority of active fiber-optic devices used in present day systems, are based on an electromechanical modulator. In one type, the optical fibers are positioned end to end and mechanically moved in or out of line. In another type, mirrors are rotated to direct beams into or away from a receiving fiber. This can be accomplished mechanically or with piezoelectric or electrostatic drivers. These mechanical devices intrinsically lack speed and long term reliability.

Alternatively, fast (less than one microsecond) optical switches, using a solid electro-optic crystal in which birefringence can be induced by application of an electric field to the crystal, have been developed. Operation is based on rotating the plane of polarization of light with respect to the orientation of an analyzer that blocks or transmits light depending on the polarization direction. The basic arrangement works efficiently if incoming light is polarized with a particular orientation. However, randomly polarized light suffers a loss. This deficiency may be overcome by using additional elements that split incoming light into two orthogonal polarizations, passively rotating one to match the other, and combining the two into a single beam fed to the basic modulator. However, the suggested electro-optic crystals require voltages of one kV or more for operation. Accordingly, such devices are not well suited for many applications, including for telecommunication devices.

Additional modulators have been constructed using a tapered plate, a Faraday rotator or solid electro-optic crystal, and a second tapered plate. The Faraday rotator is controlled by varying the current in an external coil, which varies a magnetic field. But, the suggested electro-optic crystals require inefficient kilovolt drive voltages. Also, electrode design also effects polarization dependence and modulation efficiency.

Liquid crystals are an interesting medium for electro-optical effects due to their large optical birefringence and dielectric anisotropy. For example, it is known to utilize a variety of modes of a liquid crystal cell such as π-cells, and optically controllable birefringent (OCB) cells. Unfortunately, such liquid crystal based light modulators have relatively slow response times and cannot be operated typically faster than video rates (30-80 Hz). The transient nematic effect operating in the reflective mode has been proposed to achieve fast response times in a liquid crystal cell. Fast speed is achieved by only utilizing the surface layer of a nematic cell. The bulk of the cell remains unchanged. Utilizing only the surface produces only a low phase retardation.

To overcome the above limitations, liquid crystal devices containing polymer have been developed over the past decades. These devices can be divided in two subsystems: polymer dispersed liquid crystals (PDLC); and polymer stabilized liquid crystals (PSLC). In a PDLC device, a liquid crystal exists in the form of micro-sized droplets, which are dispersed in a polymer matrix. The concentration of the polymer is comparable to that of the liquid crystal. The polymer forms a continuous medium while the liquid crystal droplets are isolated from one another. These materials have been successfully used in displays, light shutters and switchable windows. Further, there has been suggested an idea to use stretched PDLC films for producing electrically controlled polarizers. The operating principle of a PDLC polarizer is based on anisotropic light scattering of PDLC films resulting from unidirectionally oriented nematic droplets. The liquid crystal domains imbedded in the confined geometry of a polymer matrix are currently among the fastest known switching devices. Unfortunately, such systems have low filling factors and liquid crystal domain size. Moreover, these devices are only known to provide light amplitude modulation, but not light phase modulation, which is critical for beam steering applications.

To speed up the switching further, there have also been attempts to change the shape of the droplets from the spherical to ellipsoidal. This idea was also realized to produce electrically controlled polarizers. The operating principle of a PDLC polarizer is based on anisotropic light scattering of PDLC films resulting from unidirectionally oriented nematic droplets. Unfortunately, such systems have low filling factors and these devices are only known to provide light amplitude modulation, but not light phase modulation which is critical for various applications. Further, stretched PDLC devices, even at high shearing deformations, never become fully transparent.

In a PSLC device, the polymer concentration is usually less than 10 wt %. The polymer network formed in such a liquid crystal cell is either anisotropic and mimics the structure of the liquid crystal or is randomly aligned. Because of the relatively low polymer content, the size of the liquid crystal domains are relatively large ($>\lambda$), and therefore, the switching times are not short enough to use in fast switching devices.

Higher polymer content produces more dense polymer networks that result in significant light scattering in the cells.

In many cases, a desirable mode of operation is to switch large phase retardation within a short period of time. The maximum retardation shift $\Delta L_{max}=(n_e-n_o)d$ is a linear function of the cell thickness d, while the switching time varies as $d^2$. The $n_o$ and $n_e$ are the ordinary and extraordinary refractive indices, respectively. When the field is switched off, a typical liquid crystal cell with $n_e-n_o\approx 0.2$ and d=5 μm switches $\Delta L_{max}=1$ μm within $\tau_{off}=\gamma_1 d^2/\pi^2 K \sim 25$ ms, where $\gamma_1 \sim 0.1$ kg $m^{-1} s^{-1}$ and $K \sim 10^{-11}$ N are the characteristic rotation viscosity and elastic constant, respectively.

Based upon the foregoing, it is evident that there is still a need in the art for a liquid crystal device which has improved switching times, which can provide maximum phase retardation and still provide minimal scattering of light in the various modes.

SUMMARY OF THE INVENTION

It is, therefore, an object of the present invention to provide a new liquid crystal light modulating material that decouples the thickness of the liquid crystal layer and the switching speed. The material comprises interconnected microdomains of a liquid crystal dispersed in a stressed polymer structure. The stress deformation imposes unidirectional orientation of the liquid crystal. The new material is optically transparent and provides electrically controllable phase modulation of the incident light.

It is another aspect of the present invention to provide a method of making stressed liquid crystal film, comprising: mixing a solution of liquid crystal material and a curable monomer; phase-separating the solution to form a film with an interpenetrating structure of polymer and interconnected liquid crystal domains having their liquid crystal directors randomly oriented; and applying a force to the film to orient the liquid crystal domains in a single direction and cause the film to appear substantially transparent. Application of an electric field to the liquid crystal material reorients at least some of the liquid crystal areas and generates a corresponding phase shift of light impinging the cell.

BRIEF DESCRIPTION OF THE DRAWINGS

For a complete understanding of the objects, techniques and structure of the invention, reference should be made to the following detailed description and accompanying drawings, wherein:

FIG. 1A is a schematic representation of the cell after polymerization; FIG. 1B is a schematic representation of the cell after application of a shearing force; and FIG. 1C is a schematic representation of the cell after application of an electric field.

DETAILED DESCRIPTION OF THE INVENTION

Figure 1A:
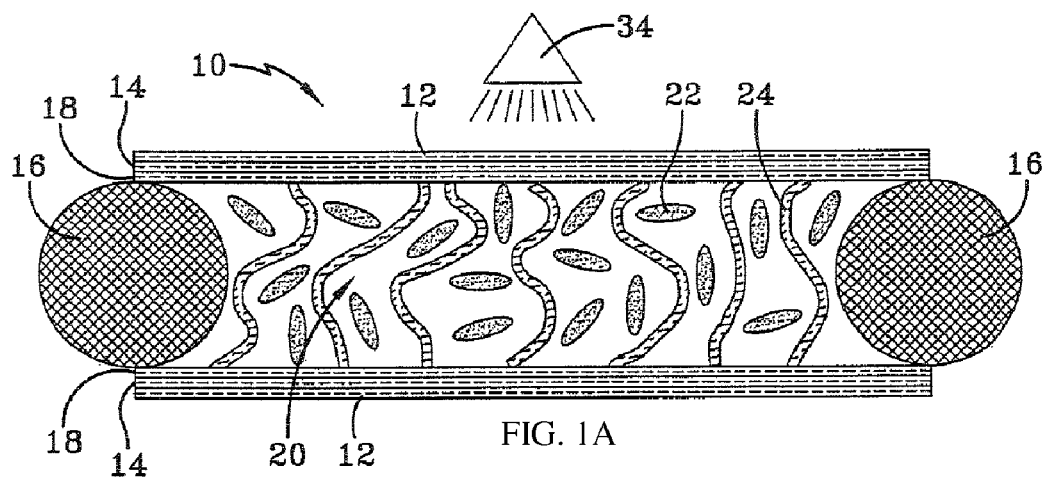
FIGS. 1A-C are schematic drawings of a liquid crystal cell according to the present invention.
Figure 1B:
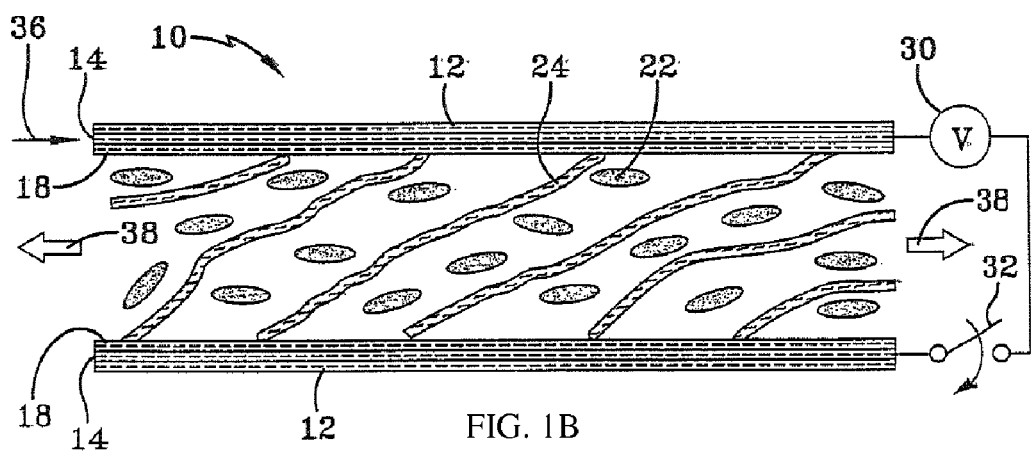
Figure 1C:
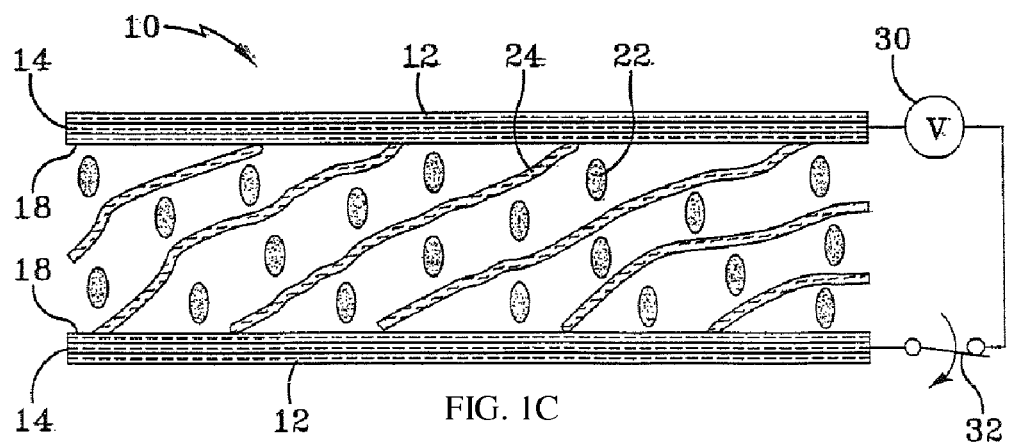

Referring now to the drawings and in particular to FIGS. 1A-C it can be seen that a liquid crystal cell according to the present invention is designated generally by the numeral 10. In FIG. 1A, the cell 10 includes a pair of opposed substrates 12 wherein at least one of the substrates 12 is made from a transparent material such as glass or plastic and wherein the other substrate is either similarly transparent, black, colored, or reflective, such as provided by an aluminum substrate. Each facing surface of the substrates 12 has at least one electrode 14 disposed thereon. Of course an aluminum substrate may itself function as the electrode. As will be described in further detail, the electrodes 14 may cover the entire surface of the substrate or the substrate may have a plurality of electrodes disposed thereon. For example, the electrodes may be configured on one substrate in a plurality of rows which have periodic spacing therebetween. If desired, the other substrate may also be provided with a plurality of electrodes configured in columns so that the intersecting electrodes on the two substrates of the cell may form a plurality of pixels. It will be appreciated that the end use or application of this invention will likely dictate the configuration of the electrodes with respect to the substrates. In any event, the substrates are spaced apart from one another by a plurality of spherical spacers 16 or equivalent structures, such as rods or other means known in the art for maintaining a space between the substrates. If desired, but not required, alignment layers 18 may be disposed on the electrodes so as to assist in the alignment of the liquid crystal material to be used. Alternatively, other insulating layers may be applied to the alignment layers if desired. As will become apparent, no specialized surface treatments that produce a preferred liquid crystal alignment are required to practice this invention. In other words, the electrodes may have direct contact with the material 20.

Filled in between the substrates 12 is a light modulating material 20 which comprises a liquid crystal material and a monomer/polymer material. Preferably, the liquid crystal material is chosen from a group that includes nematic liquid crystals, cholesteric liquid crystals, and smectic liquid crystals. In an embodiment, the light modulating material 20, once filled between the substrates 12 is exposed to a predetermined wavelength of ultraviolet light from a light source 34 so as to polymerize the monomer and to form liquid crystal domains or areas 22. Other processes to form such a structure within the material 20 are contemplated, including such with thermosets and thermoplastics.

A voltage supply and appropriate control electronics system 30 is connected between the electrodes 14 for applying an electric field to the light modulating material 20. A switch 32 may be interposed between one of the electrodes and the power supply 30. As noted previously with respect to an embodiment, a UV light source 34 may be utilized for polymerizing the monomer so as to form the interpenetrating polymer chains 24 which extend between the surfaces of the substrates 12.

In a preferred embodiment, the material 20 is prepared in solution form and pre-separated with ultraviolet irradiation at an elevated temperature, such as above the nematic-isotropy transition temperature of the liquid crystal material. Afterwards, the material 20 is cooled to room temperature while still irradiating with ultraviolet light to form a film 26 of separate polymer 24 and liquid crystal domains 22 having their liquid crystal directors randomly oriented.

Figure 2:
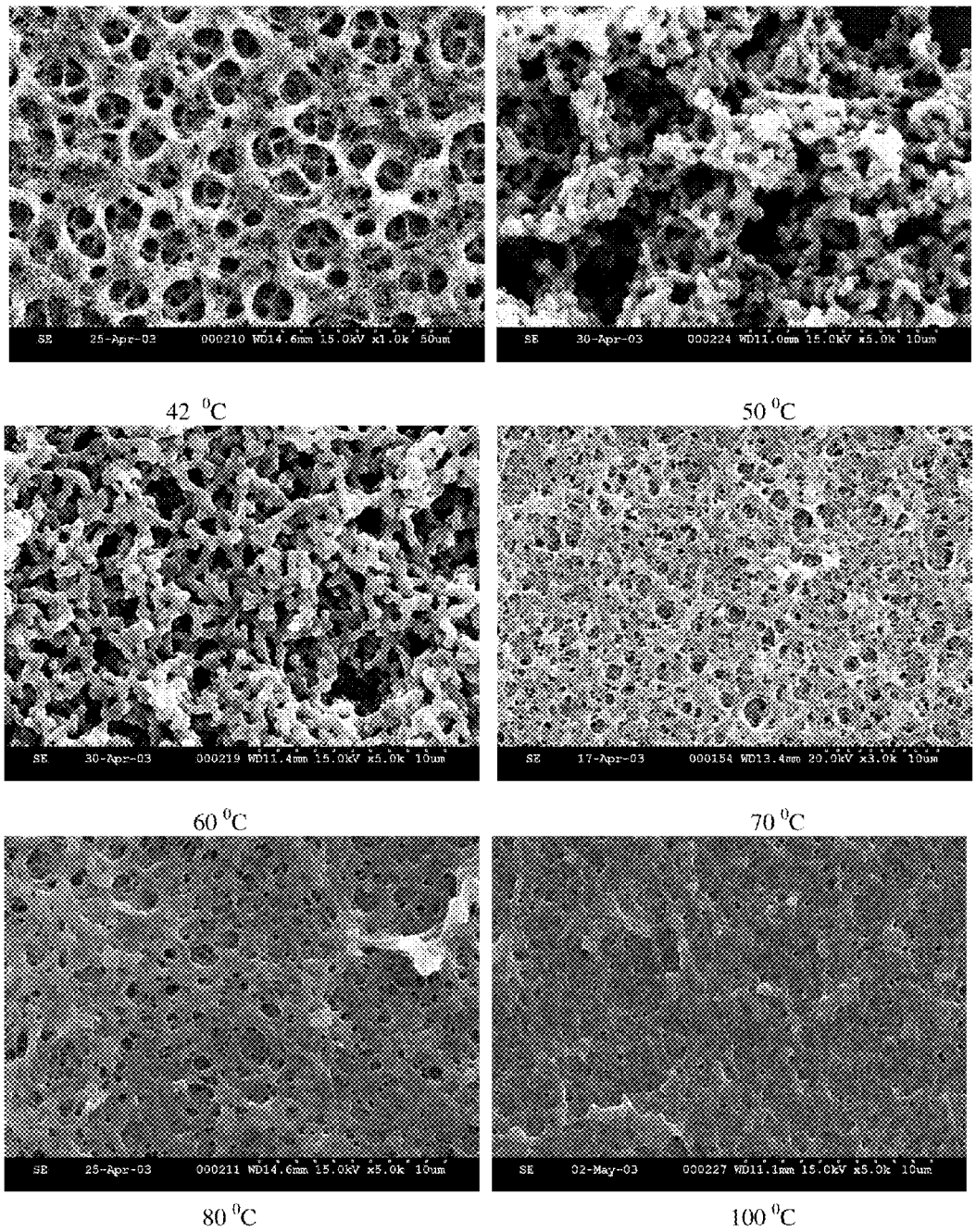
FIG. 2 shows scanning electron microscope (SEM) images of the films made according to the present invention, wherein the scale is 10 μm.

It is known from the previous research of the PDLCs that the structure of the obtained polymer film depends on the temperature of the polymerization. FIG. 2 shows the structure gradually changes from ball-like to polymer chains structure and then to the structure of polymer sheets when the temperature of polymerization changes from 42 to 100° C. The most dramatic change in the structure occurs somewhere between 60 and 70° C. that includes the nematic-isotropic (N−1) transition temperature of the liquid crystal that were used. The domains of the liquid crystal become very small and the polymer chains appear to be very tiny. Such structural changes suggested the procedure of the films polymerization in this particular example. First the cell was irradiated at a uniform temperature higher than the N−1 transition temperature of the liquid crystal. Then the cell was irradiated at the temperature of 20° C. (room temperature) with the UV light of the same intensity. The first step created a very developed tiny polymer structure while the second step finishes the phase separation more effectively and strengthens the structure created during the first step. For other examples, the desired polymer and liquid crystal domain structure may be formed by other suitable techniques.

Figure 3:
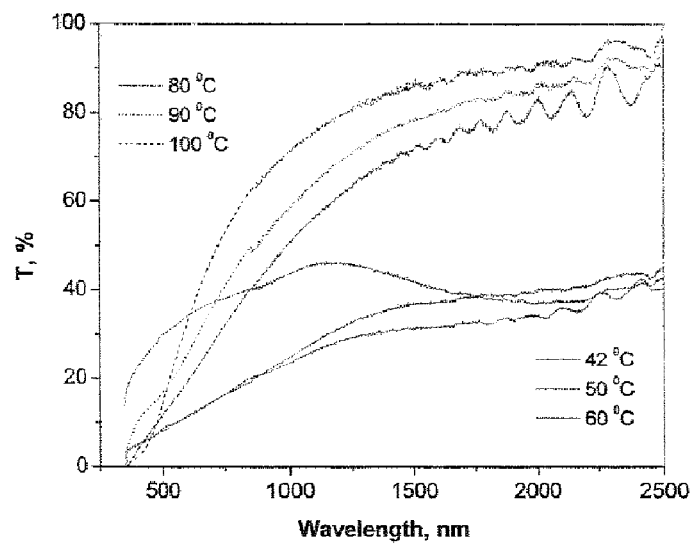
FIG. 3 is a graphical representation of the transmittance spectra of SLC films prepared at different temperatures during the first step of the polymerization.

The structure of the polymerized film determines its transmittance. The films, polymerized at a temperature lower than the N−1 transition temperature of the used liquid crystal, demonstrate higher scattering (FIG. 3; lower branch of the curves), while the films polymerized at higher temperatures are significantly more transparent (FIG. 3; higher branch of the curves). The higher the temperature of the polymerization, the better is the transmittance. These data suggest that it may be desirable to perform the polymerization step at a temperature that is about 5-50° C., and more preferably about 10-30° C., above the N−1 transition of the pure liquid crystal. For example, for the commercially available E7 liquid crystal, the best results were achieved when the polymerization was performed ~30° C. higher than the $T_{N-I}$. To check the prediction further, SLC cells with the commercially available liquid crystal E44 were prepared. This liquid crystal has a very close chemical structure to E7 but has higher values of Δn and Δε, and the N-I transition temperature of the E44 is about 100° C. Thus, the films were polymerized at a temperature in the region of 120-130° C. which produced the necessary structure and optical quality.

It is desired to provide uniform orientation or alignment of the liquid crystal directors throughout the thickness of the film or cell 10. For example, this can be accomplished by the application of a force, such as a mechanical shear, that orients all the liquid crystal molecules in the direction of the applied force. The orientation is achieved throughout the thickness of the cell. In one embodiment it has been found that by holding one of the substrates 12 in a fixed position and applying a displacement or shearing force 36 to the other substrate in a linear direction provides the necessary application of force. The amount of shearing has been found to correlate to the amount of phase shift for light impinging upon the cell in the manner that will be discussed hereafter in further detail. Alternatively, the liquid crystal molecules can be oriented or aligned by stretching the film 10 in a linear direction. In other words, both ends of a film 10 could be grasped at opposite ends and pulled an appropriate amount by forces indicated by the numeral 38. It is envisioned that other applications of mechanical force to either the cell 10 or the film 26 that is formed between the substrates will result in the desired alignment properties.

As best seen in FIG. 1C, application of an electric field causes the liquid crystal material to align in a homeotropic texture. In contrast to traditional PDLC films, the cell 10, which may also be referred to as Stressed Liquid Crystals (SLCs), has vastly improved transmittance properties after shearing. SLCs scatter the light slightly after a preparation of the cell. Accordingly, application of an electric field does not change the optical appearance of the SLCs film, but changes the phase retardation of the film wherein the liquid crystal molecules tend to orient along the electric field. Although not visible to the naked eye, the changes in the orientation can be seen if the cell is placed between crossed polarizers. As shown in FIG. 1C, application of an electric field by closure of the switch 32 or by use of the electronics system 30 drives the liquid crystal directors into the homeotropic texture, providing the change of the phase retardation. Of course, the final optical appearance of the cell depends on the polarization of the incoming light and the configuration of any polarizers on one or both sides of the cell 10.

To produce oriented droplets of liquid crystal in the polymer matrix, the substrates were sheared relative to each other (FIG. 1C). The observation of the cell between crossed polarizers shows that this cell possesses anisotropy in the direction of the shearing the substrates or of the force applied.

Figure 4:
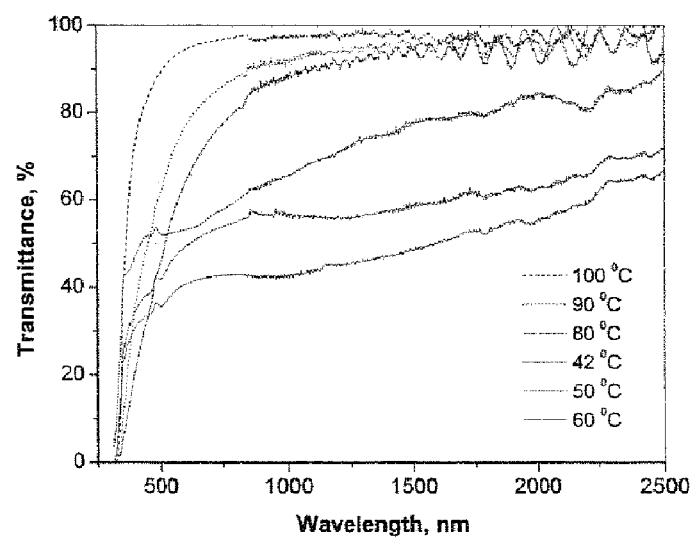
FIG. 4 is a graphical representation of the transmittance spectra SLC films prepared at different temperatures during the first step of the polymerization when the shearing deformation of 100 μm applied to the cells.
Figure 5:
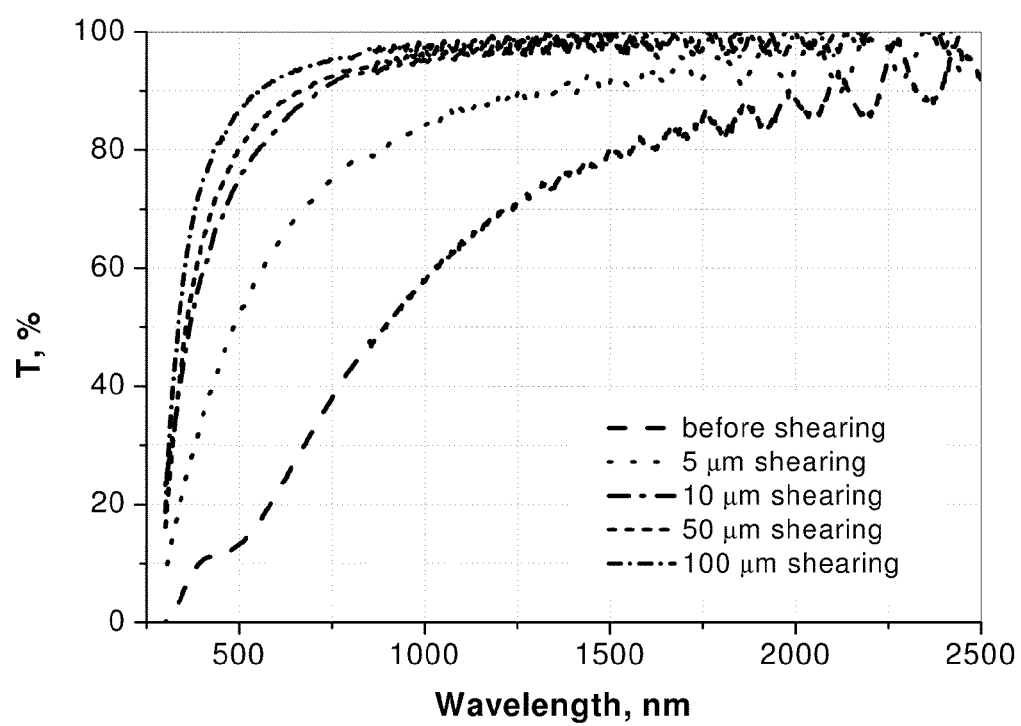
FIG. 5 shows how the transmittance spectra of the SLC film changes as the applied deformation increases.

It was discovered that the intrinsic scattering of such films decreased drastically with the application of the shearing deformations. FIG. 4 shows that this is valid for the films made at any temperature of polymerization. The region of transparency is broader for the films made at a higher temperature. For example, the SLC film made at 100° C. has transmittance of about 98% starting from 750 nm, whereas the SLC film made at 90° C. has transmittance of about 98% starting from 1250 nm. FIG. 5 shows how the scattering disappears with increase of the applied shearing.

Figure 6:
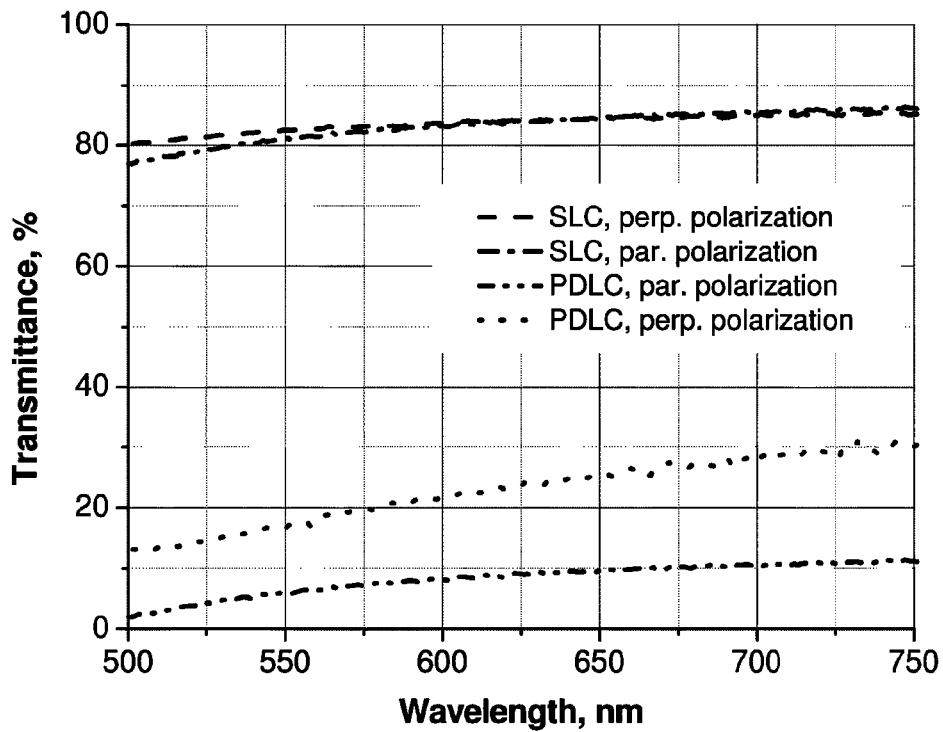
FIG. 6 is a graphical representation of transmittance vs. the wavelength of light comparing the SLC cell according to the present invention to prior art of polymer dispersed liquid crystal cells.

FIG. 6 shows difference in transmittance for the SLC material and the PDLC material made of the same components and kept under the same shearing stress. The transmittance of the SLC cell does not depend on the polarization while the transmittance of the PDLC cell does and is much lower for all polarization than the SLC cell's transmittance.

Because the liquid crystal domains were oriented unidirectionally, the standard consideration for a uniaxial crystal can be used. When a plane wave is incident normally to a uniaxial liquid crystal layer sandwiched between two polarizers, the outgoing beam will experience a phase retardation $\delta$ due to the different propagation velocities of the extraordinary and ordinary rays inside the film, $\delta = 2\pi d(n_e - n_o)/\lambda$, where d is the cell gap, $\Delta n$ is the birefringence and $\lambda$ is the wavelength. For a homogeneous cell, the effective phase retardation depends on the wavelength and the applied voltage. When the voltage exceeds the Freedericksz threshold voltage, the liquid crystal director is tending to be oriented along the direction of the applied electric field. As a result, the effective birefringence and, in turn, the phase retardation is decreased. Thus one can electrically control the phase retardation of the film. The process is reversible upon removal of the voltage.

The electro-optic characteristics of the cells were measured by a standard method in the art (see, for example, "Electro-optic effects in liquid crystal materials" by Blinov and Chigrinov, Springer-Verlag, NY, 1994). These methods are integrated in the Electro-Optic Measurements (EOM) software package developed at the Liquid Crystal Institute, Kent State University. The cells were placed between crossed polarizers. The optical axis of the cells was set at 45° to the polarization direction of the polarizers. An electric field was applied to the electrodes of the cells and the dependence of the shift of the phase retardation produced by the film on the applied voltage, V, was measured. In addition, the dynamics of the phase retardation shift after abrupt switching ON and switching OFF of the electric field was measured.

To demonstrate typical electro-optical behavior of the SLC material, a 22 μm thick film using the liquid crystal 5CB and UV curable monomer NOA65 with the weight concentration of the components 90% and 10% was prepared, respectively. The cell made of two ITO-glass substrates was filled with the mixture and irradiated with UV light in two steps: 30 minutes with the UV light of the intensity of ~30 m W/cm² at the temperature of 60° C. and then another 30 minutes with the UV light of the same intensity and at the temperature of 25° C. After irradiation, the cell was placed in a specially constructed shearing device where the shearing distance was controlled with the accuracy of 5 μm.

Figure 7:
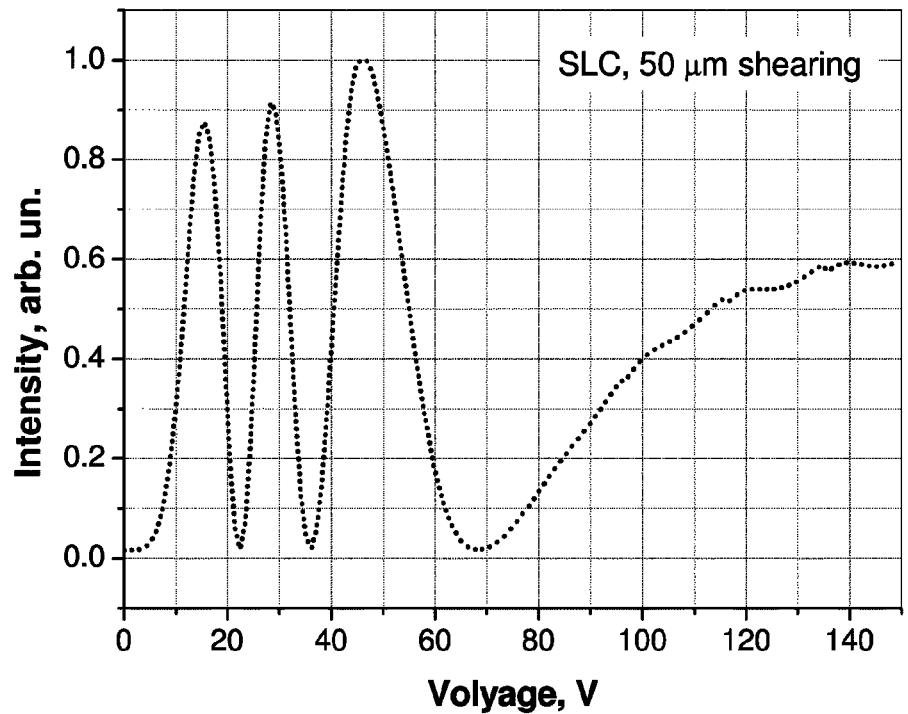
FIG. 7 shows the dependence of the transmittance of the SLC cell vs. applied voltage measured between two crossed polarizers ($\lambda$=0.632 μm). The cell's thickness is 22 μm, the shearing distance is 50 μm.
Figure 8:
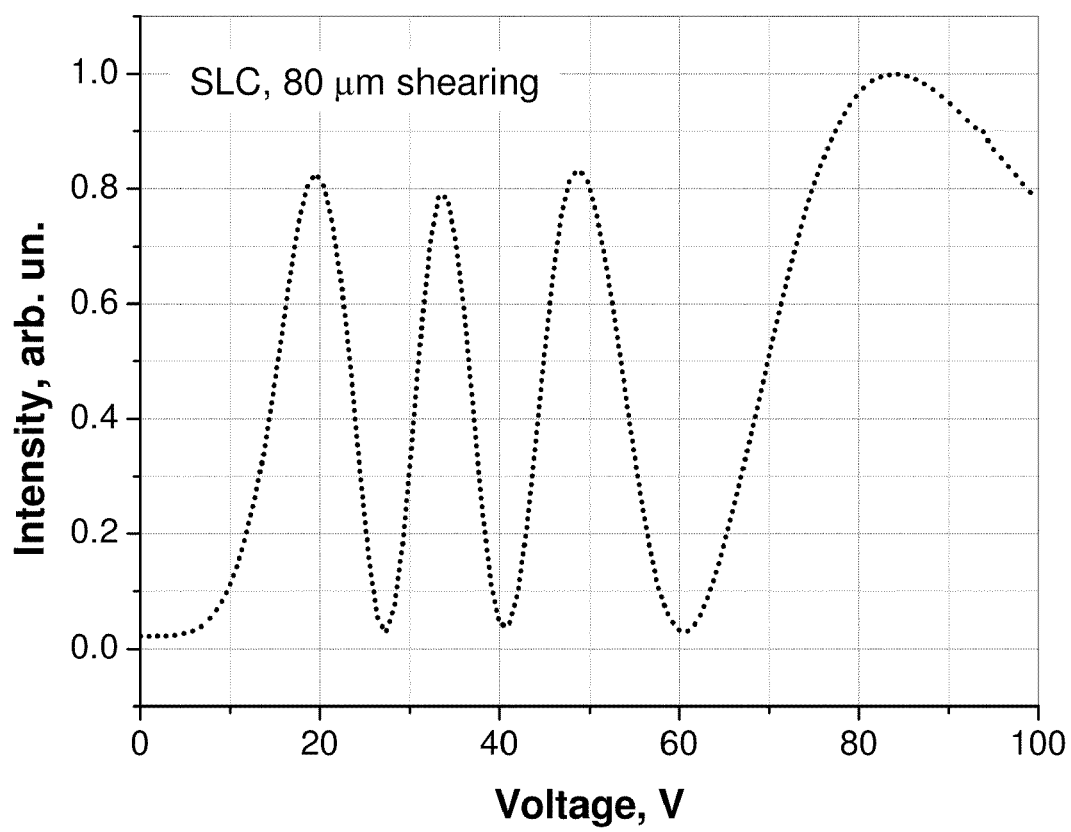
FIG. 8 shows the dependence of the transmittance of the SLC cell vs. applied voltage measured between two crossed polarizers ($\lambda$=0.632 μm). The cell's thickness is 22 μm, the shearing distance is 80 μm.

FIG. 7 shows the dependence of the phase retardation as a function of an applied voltage measured in transmittance mode for the SLC film when the shearing distance is 50 μm. The variation of the transmitted light intensity between two successive minima demonstrates the switch of the phase retardation equal to the wavelength of the probing light, $\lambda = 0.632$ μm, or $\delta = 2\pi$ in terms of the angular phase retardation. FIG. 7 shows that to produce the phase shift of $3\lambda \sim 1.9$ μm the SLC cell may require about 68 V; 150 V applied to the SLC cell switches 2.2 μm of the phase retardation. FIG. 8 shows the dependence of the phase retardation as a function of an applied voltage for the same SLC cell when the shearing distance is 80 μm. Counting the total number of maxima that can be produced by the cell under application of different shearing deformations, it was concluded that the higher shearing creates more uniaxial liquid crystal alignment and the cell produced higher shift of the phase retardation. The expected maximum shift of the phase retardation is $\Delta n d(1-c) = 3.78$ μm, where $\Delta n = 0.191$ birefringence of the 5CB liquid crystal, $d = 22$ μm thickness of the cells, $c = 0.1$ concentration of the polymer. If it is determined that the efficiency of the phase separation as a ratio of the expected maximum shift of the phase retardation to those values obtained experimentally, it can be stated that for this particular case the efficiency of the phase separation is about 58%. This value may be significantly higher depending on the materials used and film's preparation conditions.

Figure 9:
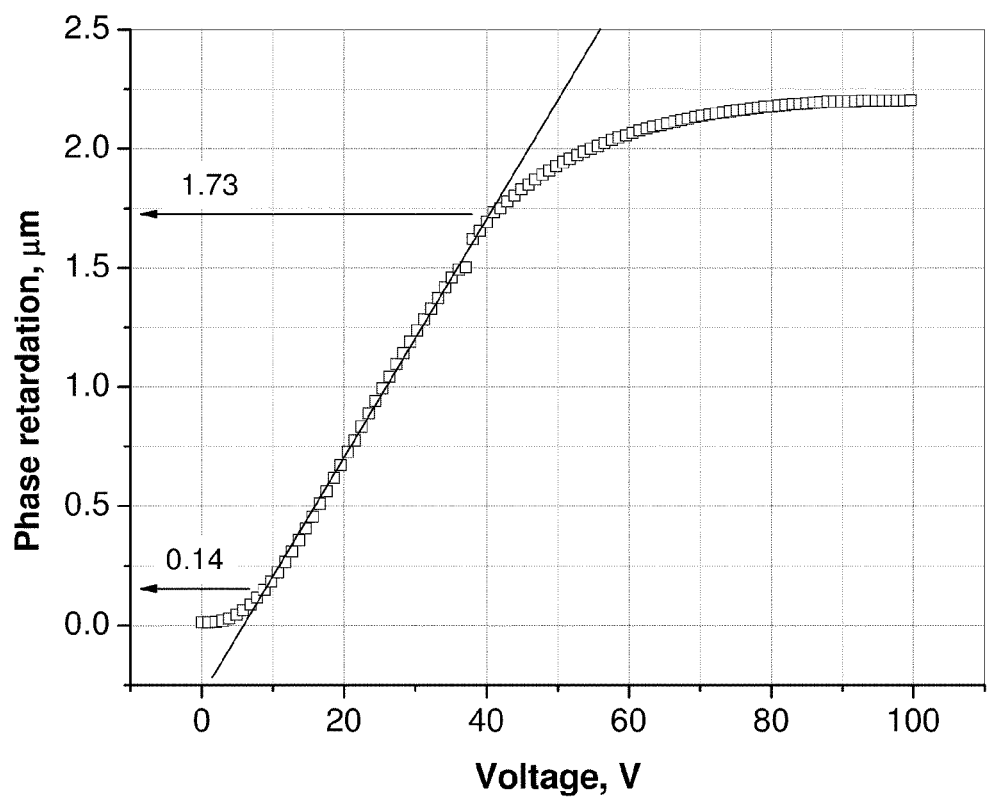
FIG. 9 is another graphical representation of the dependence of the phase retardation of the SLC cell as a function of an applied electric field.

FIG. 9 shows another representation of the phase retardation as a function of an applied voltage. As one can see, the cell can be driven in a linear regime when the induced shift of the phase retardation changes linearly with the applied voltage. This particular cell can switch about 1.6 μm of the phase retardation linearly with application of about 40 V. Such a behavior is not intrinsic to a cell filled with a pure liquid crystal and may be due to a strong confining geometry in which liquid crystal is placed. Increase of shearing enlarges the linearity region. It is demonstrated below in the specific examples that such a feature can greatly simplify the driving schemes in many practical devices.

Figure 10:
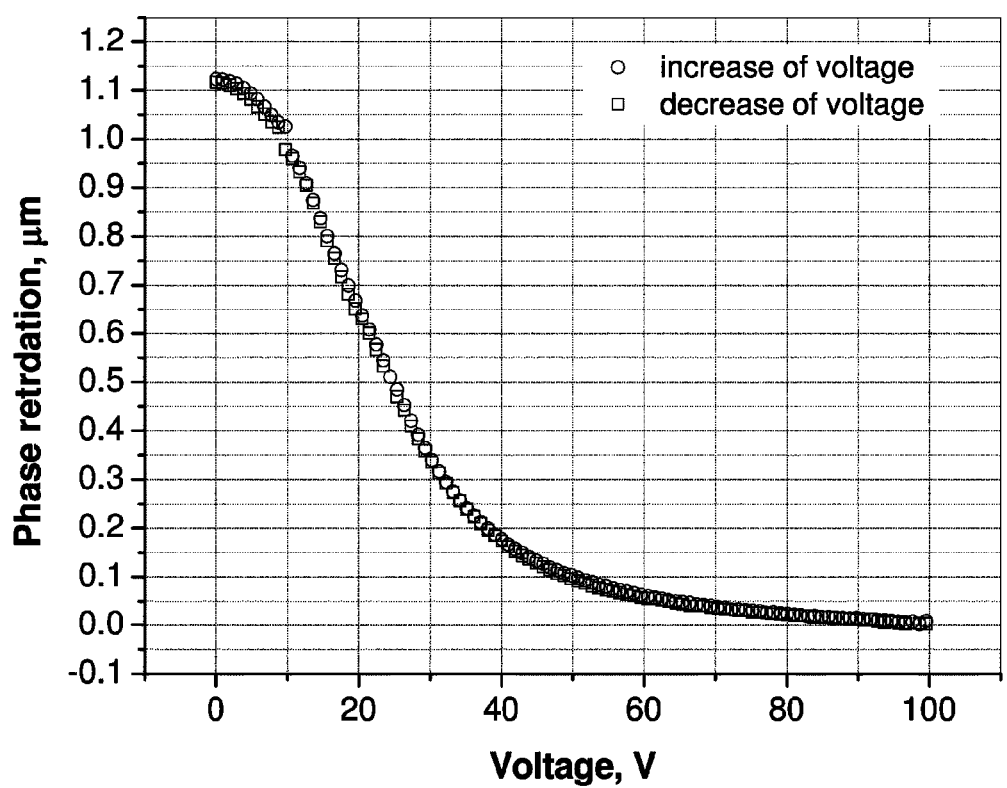
FIG. 10 demonstrates the dependence of the phase retardation of the SLC cell as a function of an applied electric field when the voltage increases (circles) and decreases (squares); the two curves significantly coincide showing absence of hysteresis.

The shearing eliminates the hysteresis that is intrinsic to all others liquid crystal-polymer dispersions, including PDLC. FIG. 10 shows the dependence of the phase retardation of the SLC cell as a function of an applied electric field when the voltage increases (circles) and when the voltage decreases (squares); the two curves significantly coincide showing absence of hysteresis.

Figure 11:
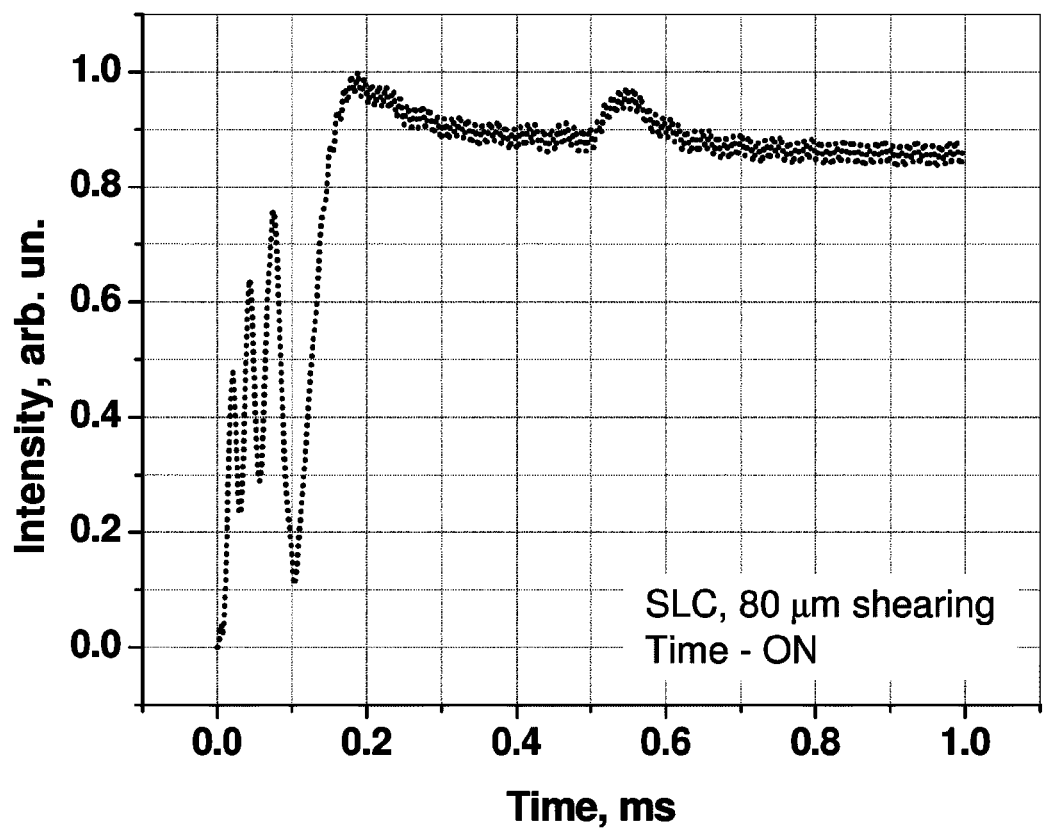
FIG. 11 shows dynamics of the time ON for the SLC cell at the application of 100 V.
Figure 12:
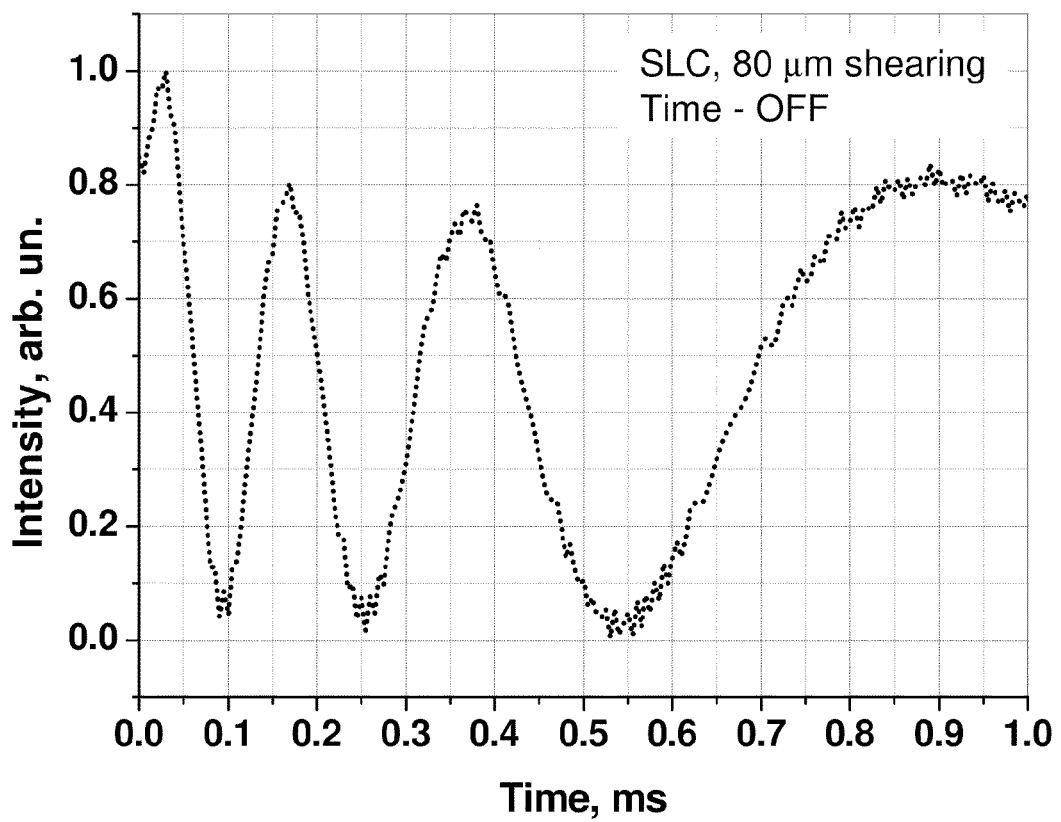
FIG. 12 shows dynamics of the time OFF for the SLC cell after removing of 100 V.

Application of the shearing deformations to a SLC cell's substrates elongates the polymer chains, changes the shape of the liquid crystal domains, causing them to have more prolonged shape as schematically shown in the FIG. 1C. Due of strong anchoring of the liquid crystal molecules with the polymer material, the molecules of the liquid crystal around of a polymer chain become oriented along the chain. All these factors together lead to the fast switching times. FIG. 11 shows that to switch ON $3.5\lambda=2.2$ μm of the phase retardation the SLC cell requires about 180 μs. The dynamics of the relaxation of the SLC cell after removing 100V is shown in FIG. 12. The relaxation time is about 2 ms.

It is also noted that the SLC film preparation technique according to the invention is well developed and simple. Further, the active area of the film may be relatively large, the film does not require any liquid crystal orientation layers that can reduce transmission through the cell, and the material operates well in a large range of temperatures.

Many modifications and variations of the invention will be apparent to those skilled in the art in light of the foregoing detailed disclosure. Therefore, it is to be understood that, within the scope of the appended claims, the invention can be practiced otherwise than as specifically shown and described. The best modes of the invention are further illustrated and described by the following specific examples.

Example 1

SLCs for Diffraction Grating and Beam Steering Devices

Using the SLC material, an OPA device was built that allows steering a MWIR laser beam over 1 milliradian in 1 millisecond. For this purpose a variable retarder was created that is capable of producing 4.5 microns of phase retardation in 1 ms. The structure and characteristics of the SLC OPA cell are described below in more detail.

The 5CB/NOA65 (90%/10%) mixture was sandwiched between ITO coated glass substrates and polymerized. The ITO layer on one glass substrate was etched to give a series of parallel electrodes. The ITO layer on the other substrate was continuous. The planar orientation of the liquid crystal was imposed by the shearing deformations in the direction perpendicular to the ITO stripes. The obtained SLC film was 22 μm thick. With zero voltage applied to the cell, all polarizations of light that pass through the cell see a uniform refractive index and no diffraction occurs. When a voltage is applied across the cell, those areas of the suspension above the ITO electrodes switch from planar to homeotropic, while the other areas remain unchanged. This produces a periodic variation in the refractive indexes and a phase grating, producing diffraction of light that passes through the cell.

Figure 13:
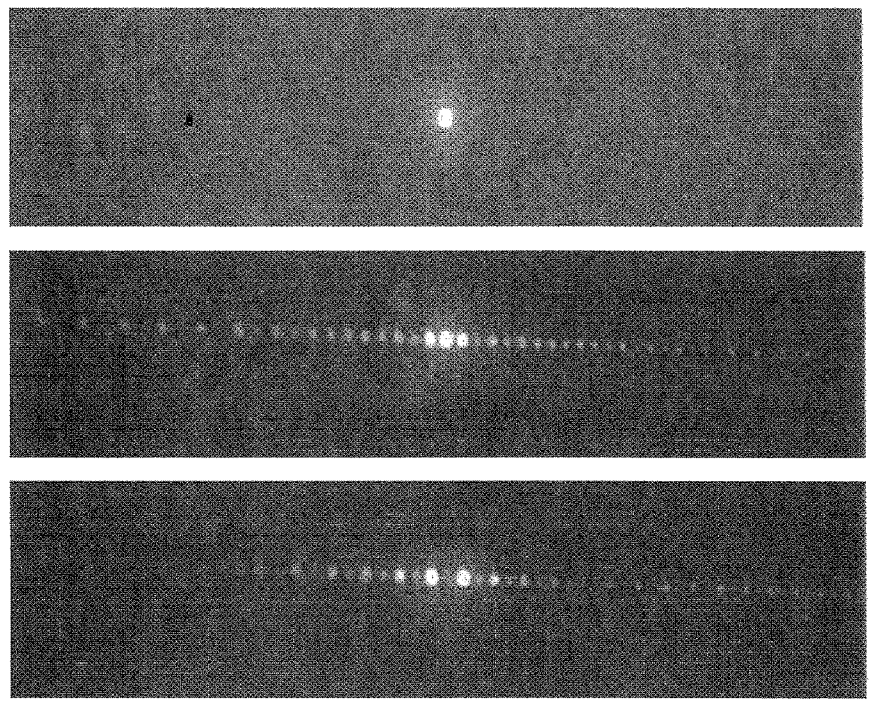
FIG. 13 is the diffraction pattern produced by the SLC cell: a, only the central spot of light can be seen without any voltage applied to the cell; b, application of a voltage to the cell led to appearance of a diffraction pattern on the screen. The most intense maximum of zero order is surrounded by two maxima of the first order; c, at some certain voltages, disappearance of the diffraction maximum of zero order while intensity of light in the diffraction maxima of the first order achieves its maximum value is observed.

To visualize operation of the SLC cell, a visible light at the wavelength $\lambda=0.632$ μm was employed. A voltage was applied to every other electrode of the cell, keeping grounded all the other electrodes, and produced a diffraction grating in the cell. The beam of a He—Ne laser passed through a polarizer, the SLC cell, telescopic system, and a diaphragm and was registered by a photodiode. In such a scheme, the diffraction pattern produced by the SLC cell was extended by the telescopic system to achieve a comfortable measurement o an optical signal in each of the diffraction maxima. The changes of the intensity of light were measured for the zero and first diffraction orders as voltage ramps from 0 to 100 V. It was determined that light can be "pumped out" from the zero order maximum to the maxima of higher orders. The remaining intensity of light in the zero order was less than 1% from its maximum value. About 83% of light transferred to the first order maxima as shown in FIG. 13.

Figure 14:
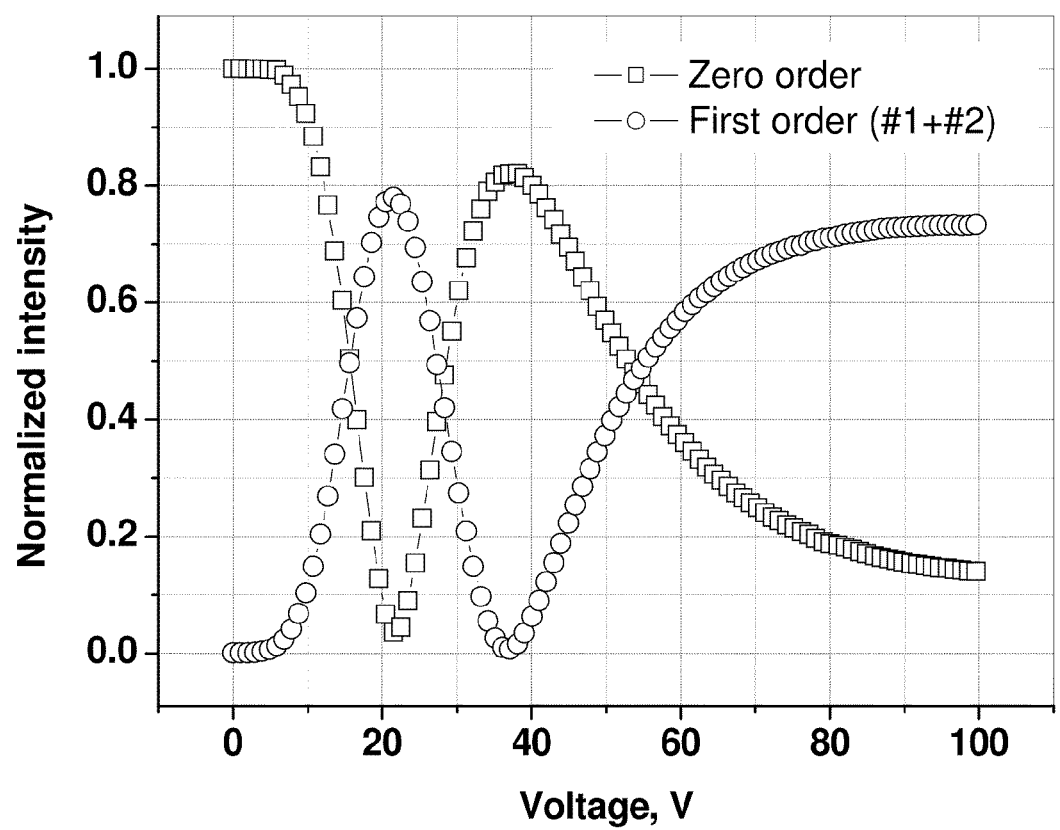
FIG. 14 shows light intensity measured in the diffraction maxima of zero and first orders as voltage ramps from 0 to 100 V. The wavelength of the testing light is $\lambda$=1.55 μm.
Figure 15:
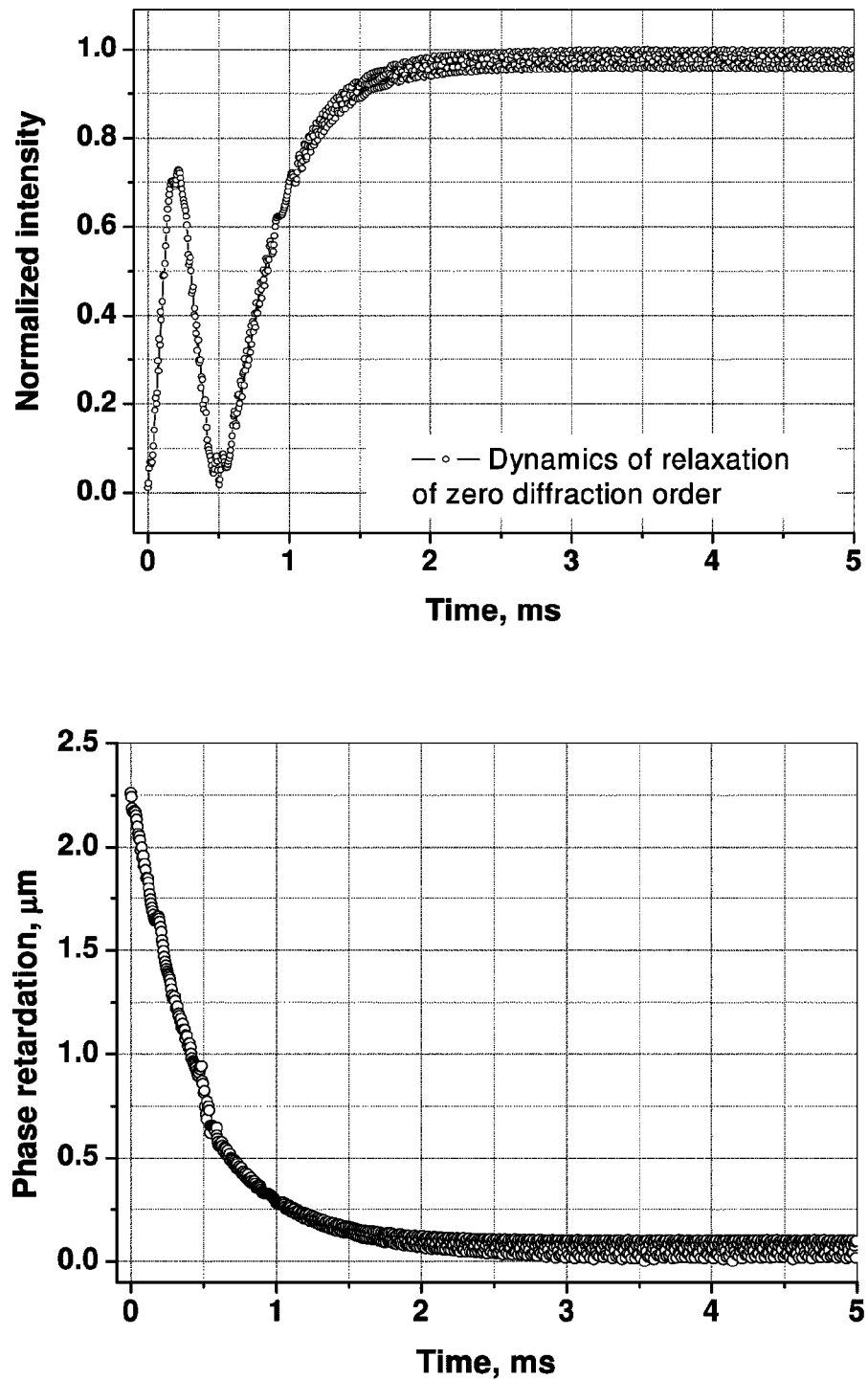
FIG. 15 shows electro-optical performance of the SLC cell measured in the zero order diffraction maximum: the graph on top-dynamics of the light intensity change; the graph on bottom-dynamics of the corresponding phase retardation produced by the cell.

The next two pictures show operation of the SLC cell registered at the wavelength of 1.55 μm. FIG. 14 shows change of the light intensity in the diffraction maxima as voltage ramps from 0 to 100 V. The cell produces a shift of the phase retardation of 2.25 microns measured in transmittance. FIG. 15 shows the dynamics of the cell relaxation as voltage drops from 100V to 0V. All the changes of the phase retardation occurred within the time of 2 ms.

Example 2

SLCs for a Large Shift of the Phase Retardation

A 340 μm thick SLC film was prepared using the mixture of the liquid crystal 5CB and UV curable monomer NOA65 with the weight concentration of the components 90% and 10%, respectively. The cell made of two ITO-glass substrates was filled with the mixture and irradiated with UV light in two steps: 2 hours with the UV light of the intensity of ~30 mW/cm$^2$ at the temperature of 60° C. and then another 2 hours with the UV light of the same intensity and at the temperature of 25° C. After the irradiation, the cell was placed in a shearing device where the shearing of 450 μm was applied.

Figure 16:
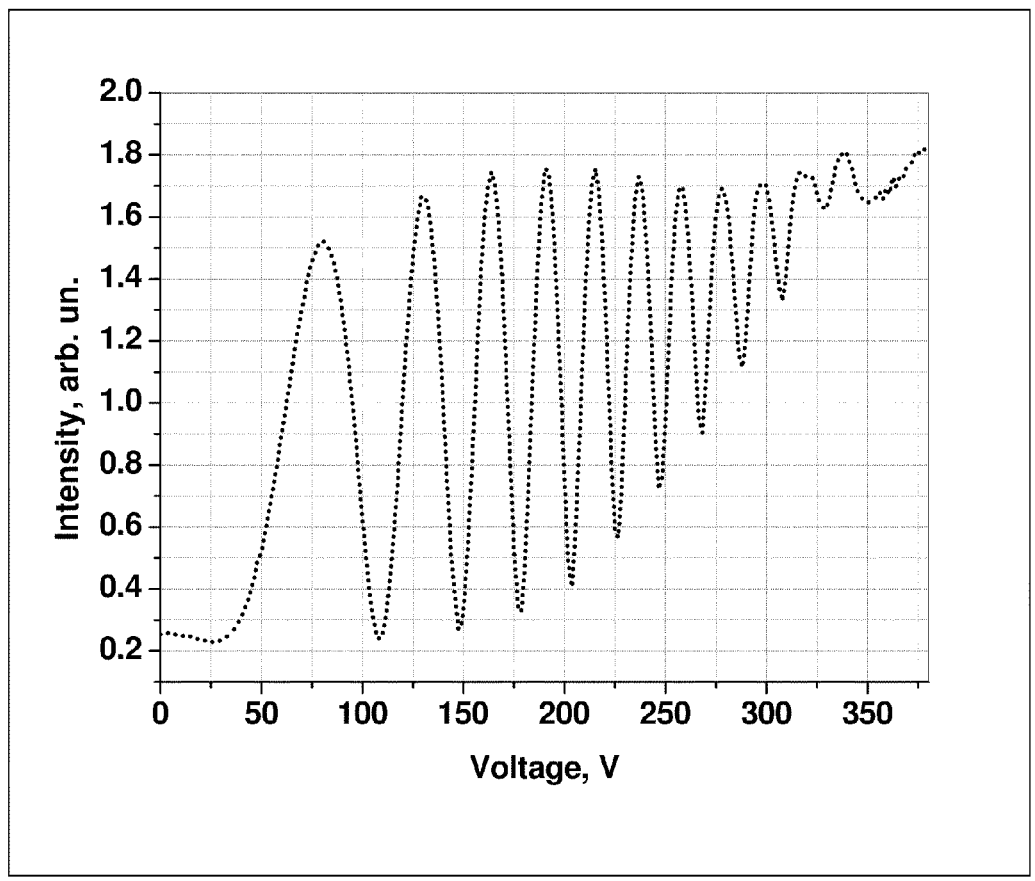
FIG. 16 shows the dependence of the transmittance of the thick SLC cell vs. applied voltage measured between two crossed polarizers ($\lambda$=1.55 μm). The cell's thickness is 340 μm, the shearing distance is 450 μm.
Figure 17:
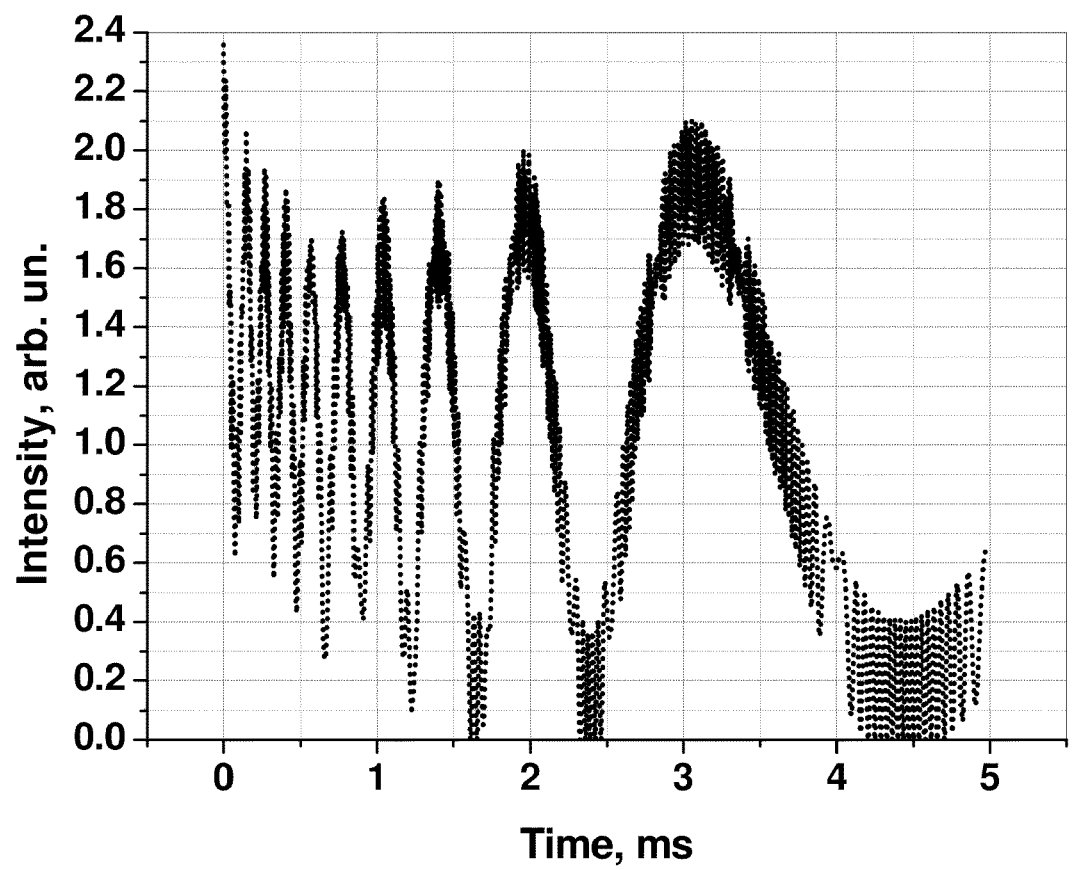
FIG. 17 shows dynamics of the phase shift relaxation after removing 380 V applied to the 340 μm thick SLC cell. The wavelength of the probing light $\lambda$=1.55 μm; the cell switches phase retardation of 10 μm only 1 ms and with the driving voltage of about 1 V/μm.

FIG. 16 shows the dependence of the transmittance of the cell versus applied voltage measured between two crossed polarizers ($\lambda=1.55$ μm). The voltage of 380V applied to this 340 μm thick cell creates the phase retardation shift of almost 20 μm. FIG. 17 shows the dynamics of the phase shift relaxation after removing the 380V applied to the cell. The cell switches phase retardation of 10 μm of total 20 within only 1 ms and with the driving voltage of about 1 V/μm.

Example 3

SLCs for Display Applications

Figure 21A:
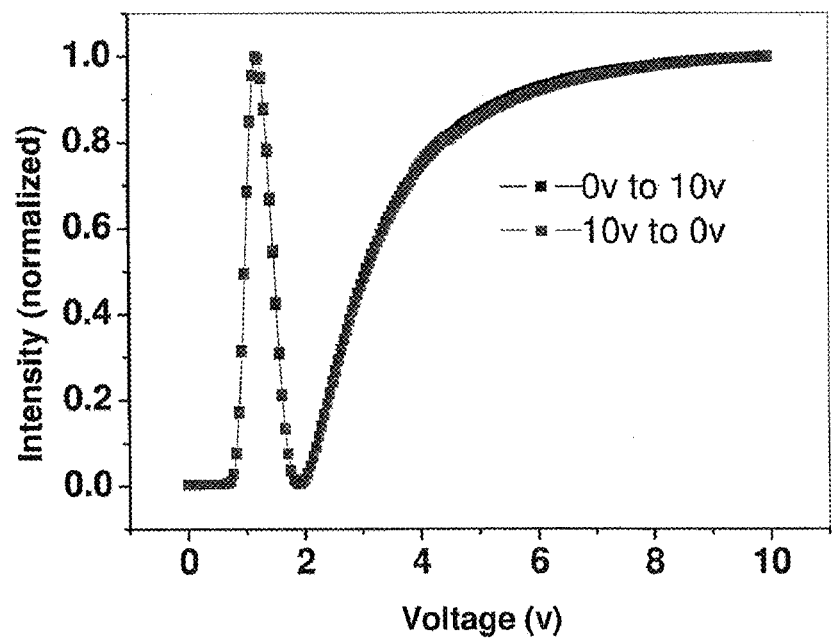
FIG. 21 shows: a) dependence of the intensity vs. applied voltage for a 5 μm thick planar cell filled with the pure 5CB liquid crystal; b) dynamics of the switching in OFF and ON states when the driving voltage is 1.2 V.
Figure 21B:
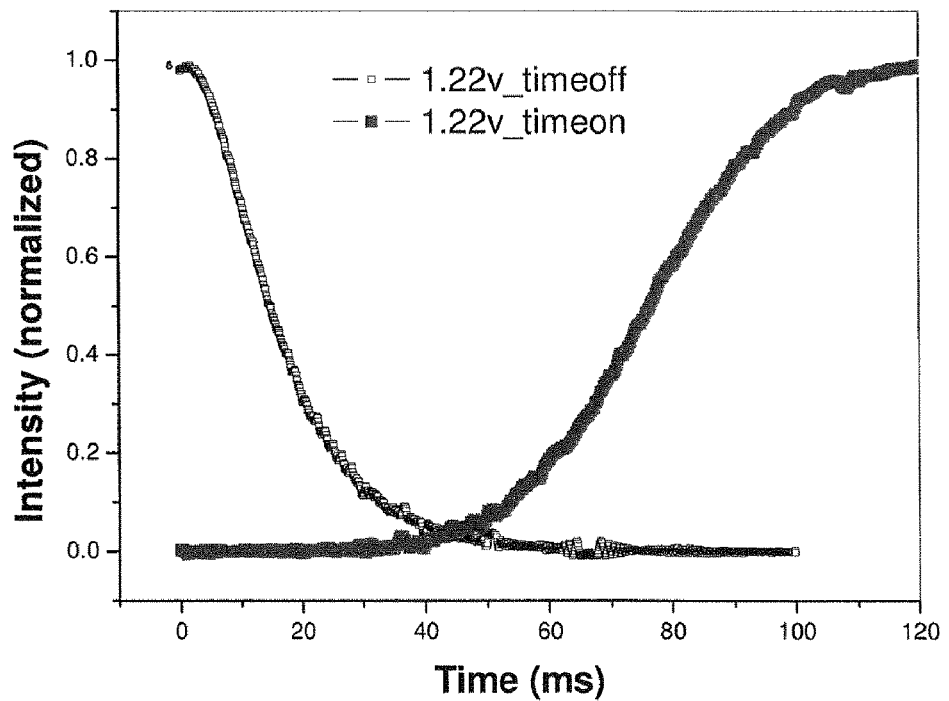

FIG. 21A shows the dependence of the intensity versus the applied voltage for a 5 μm thick planar cell filled with the pure 5CB liquid crystal material. FIG. 21B shows the dynamics of switching for a planar 5 μm thick cell filled with pure 5CB liquid crystal that operates in the ECB mode. The switching times between the dark and transparent states are tens of milliseconds.

Figure 19A:
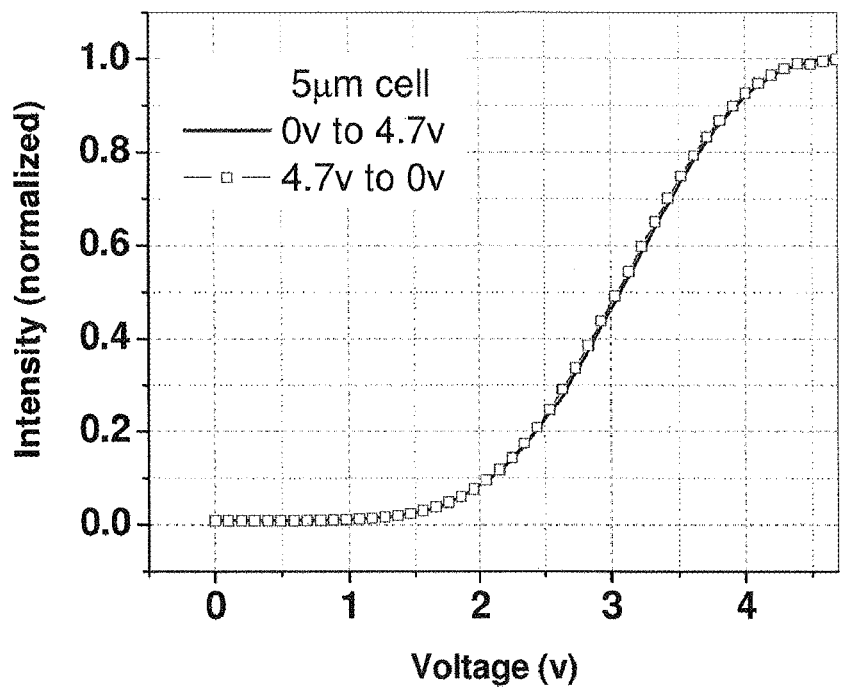
FIG. 19 shows: a) dependence of the transmitted light intensity vs. applied voltage for a 5 μm thick SLC cell with a low magnitude of applied shearing; b) dynamics of the switching in OFF and ON states when the driving voltage is 4.7 V.
Figure 19B:
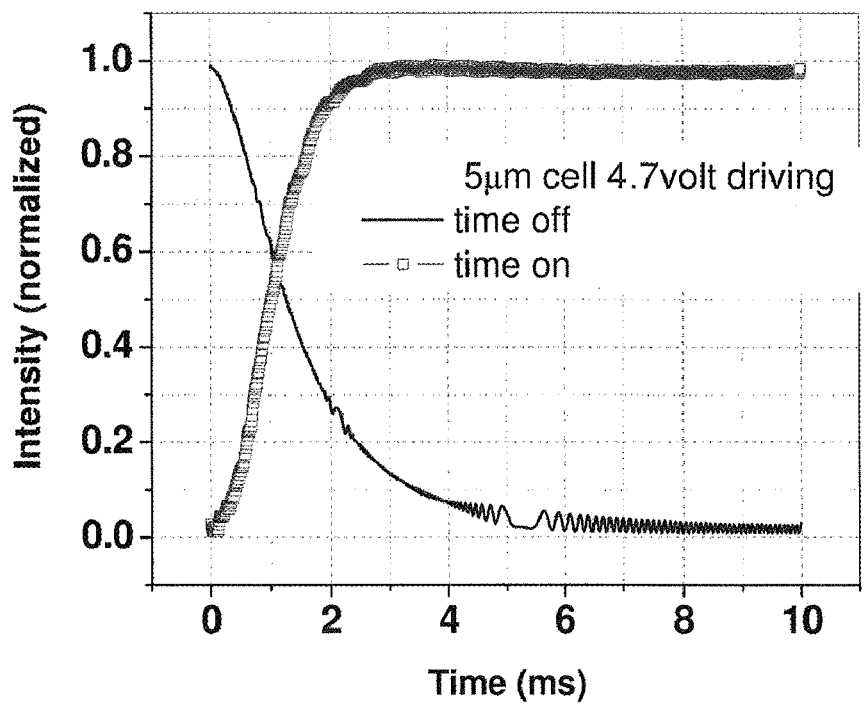
Figure 20A:
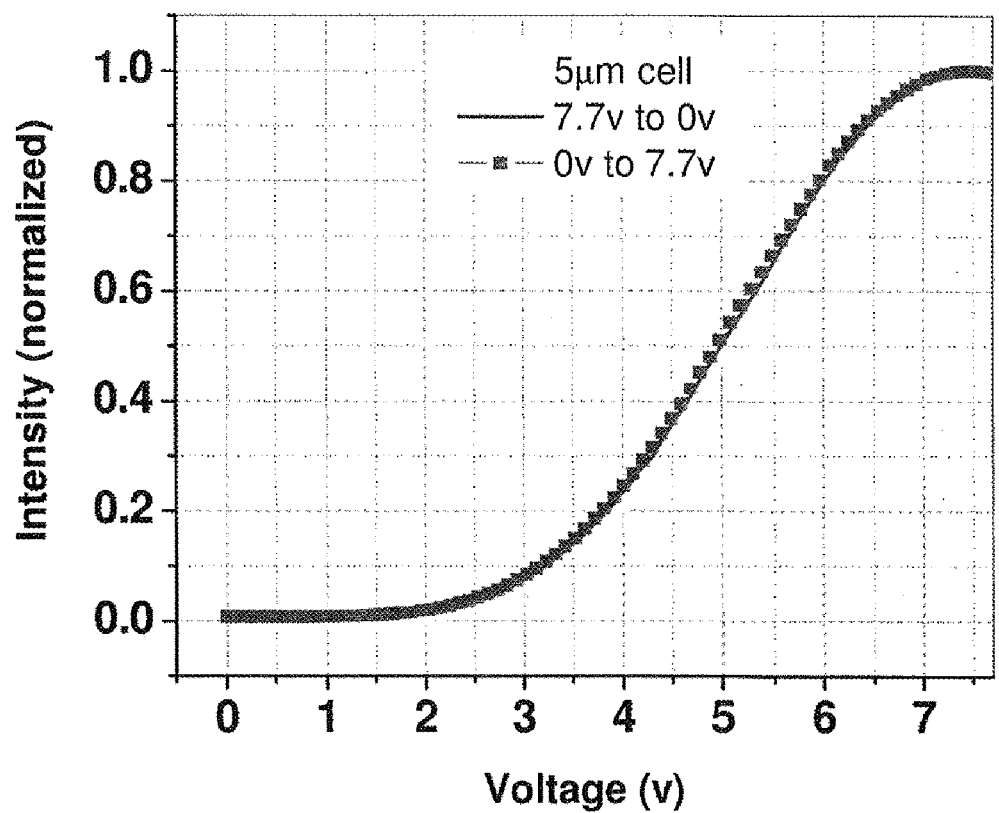
FIG. 20 shows: a) dependence of the transmitted light intensity vs. applied voltage for a 5 μm thick SLC cell with a high magnitude of applied shearing; b) dynamics of the switching in OFF and ON states when the driving voltage is 7.6 V.
Figure 20B:
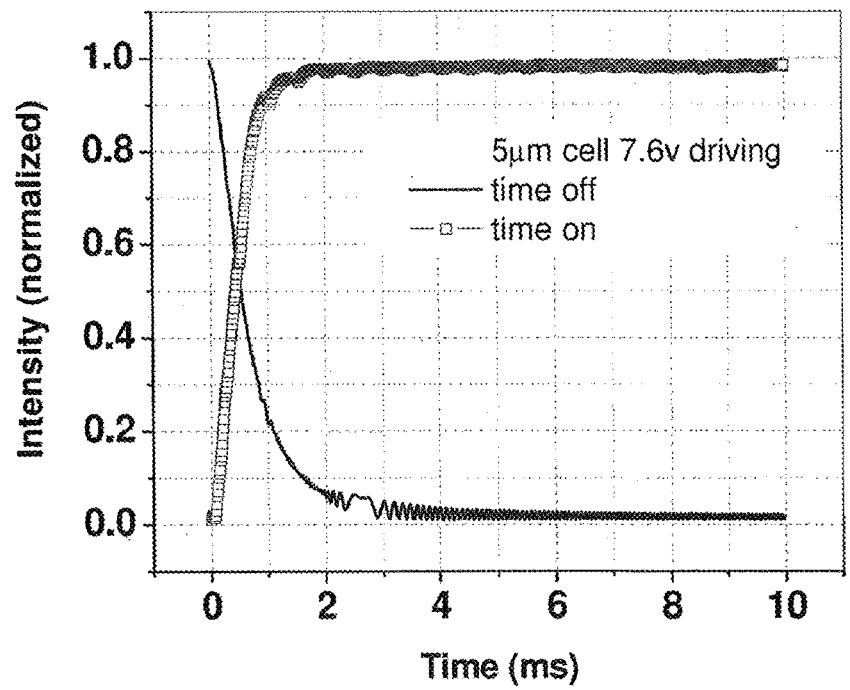

To compare, in this embodiment, thin SLC cells (~5 μm) were produced for display applications. The total phase shift that the cells are capable to provide is about 0.6 μm. FIGS. 19A and 20A show the dependence of the intensity of light that passes through the SLC cell placed between two crossed polarizers vs. applied voltage for the case with low and high shearing applied to the cell, respectively. The driving voltage depends on the magnitude of the shearing deformations and varies between 4.7 for the low shearing to 7.6 V for the high shearing deformation. Shearing also determines the switching time. FIG. 19B shows dynamics of the switching in OFF and ON states for the cell with lower shearing; time ON is about 2 ms and time OFF is about 4 ms. FIG. 20B shows dynamics of the switching in OFF and ON states for the cell with higher shearing; time ON and time OFF are both about 2 ms. In both cases the switching of the SLC cell is accomplished within the timeframe that is order of magnitude less than for the cell with pure liquid crystal.

Figure 18A:
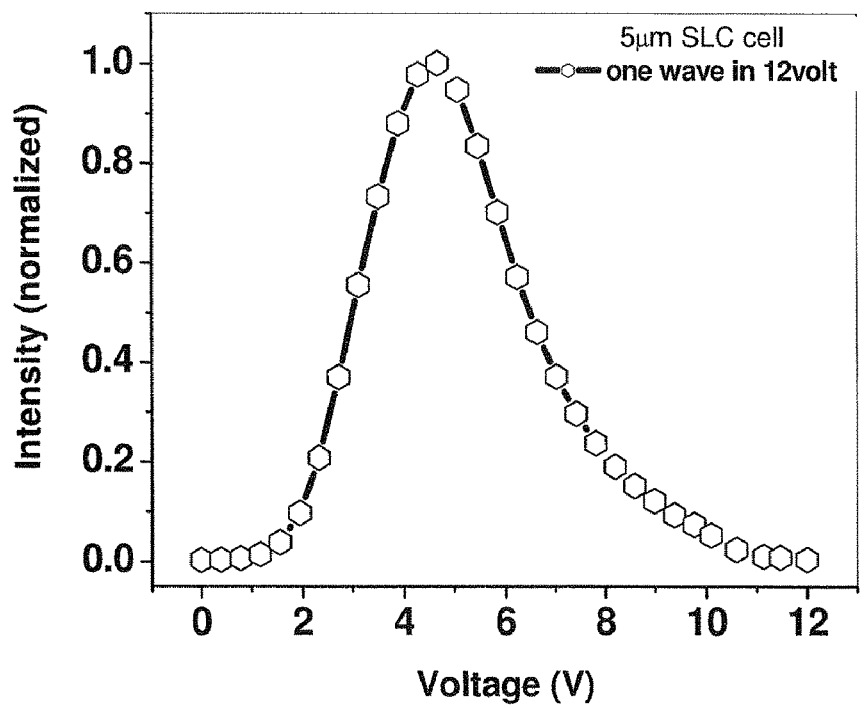
FIG. 18 shows: a) dependence of the transmitted light intensity vs. applied voltage for a 5 μm thick SLC cell with a low magnitude of applied shearing; b) dynamics of the total switching in OFF and ON states when the driving voltage is 12 V.
Figure 18B:
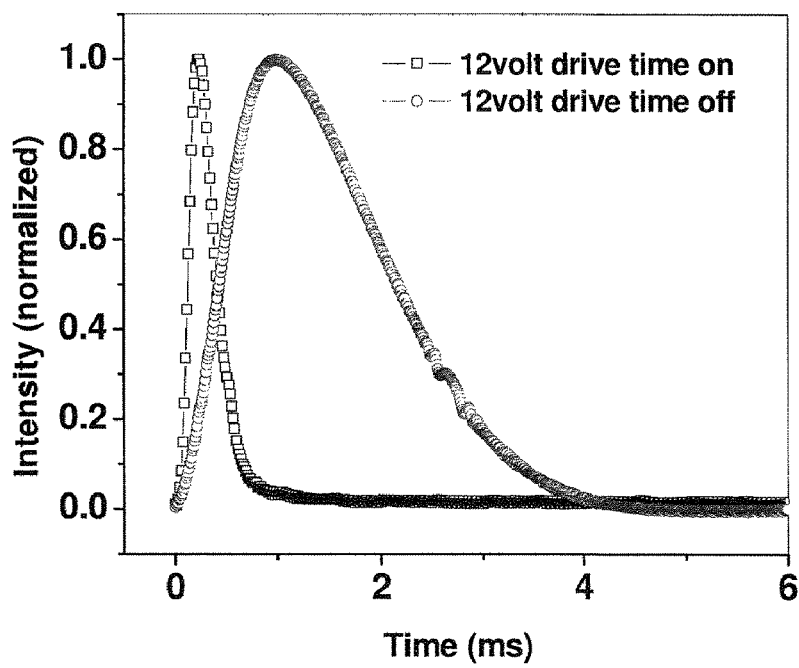
Figure 22A:
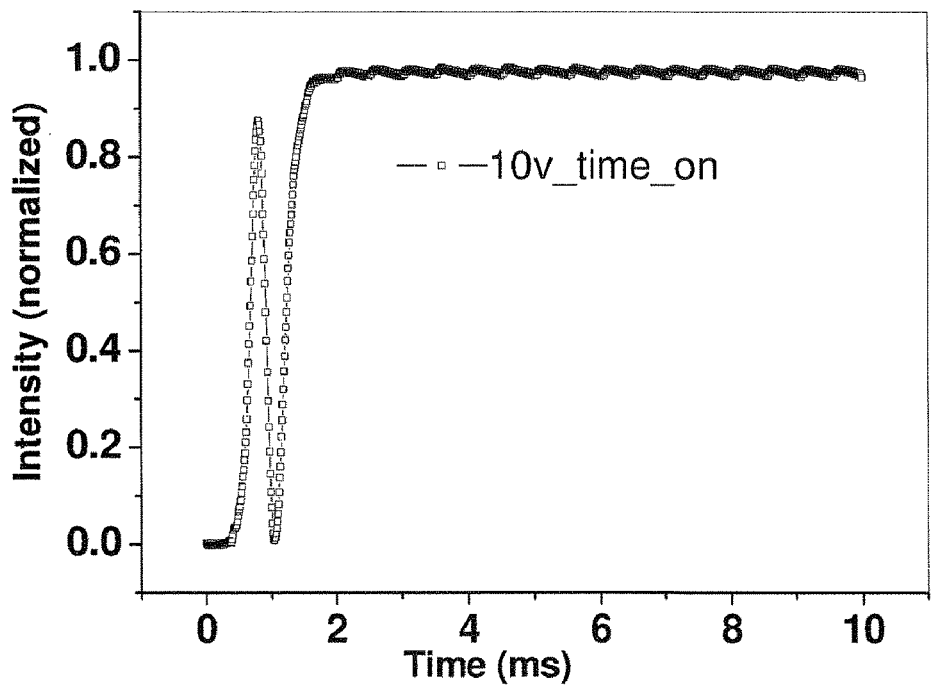
FIG. 22 shows dynamics of the switching in OFF and ON states for a 5 μm thick planar cell filled with the pure 5CB liquid crystal when the driving voltage is 10 V.
Figure 22B:
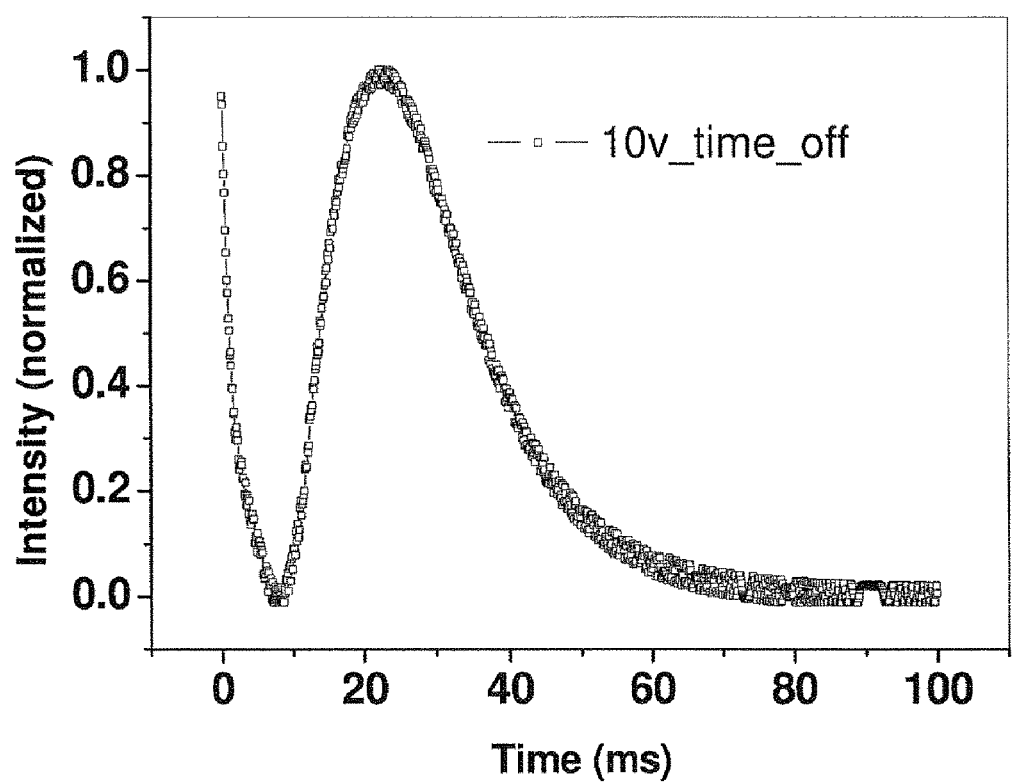

Even large difference in switching times are observed when both cells are changed between a planar and a homeotropic orientation. At approximately the same driving voltage the ON time for the SLC cell is two times shorter while the OFF time is shorter by more than 50 times (compare FIG. 18.a and FIG. 22).

Example 4

SLCs for Ultra Fast Light Modulators

A 25 μm thick film was prepared using the liquid crystal E7 and UV curable monomer NOA65 with the weight concentration of the components 80% and 20%, respectively. The cell made of two ITO-glass substrates was filled with the mixture and irradiated with UV light in two steps: 30 minutes with the UV light of the intensity of ~30 mW/cm$^2$ at the temperature of 100° C. and then another 30 minutes with the UV light of the same intensity and at the temperature of 25° C. After irradiation, the cell was placed in a shearing device where the shearing of 150 μm was applied.

Figure 23:
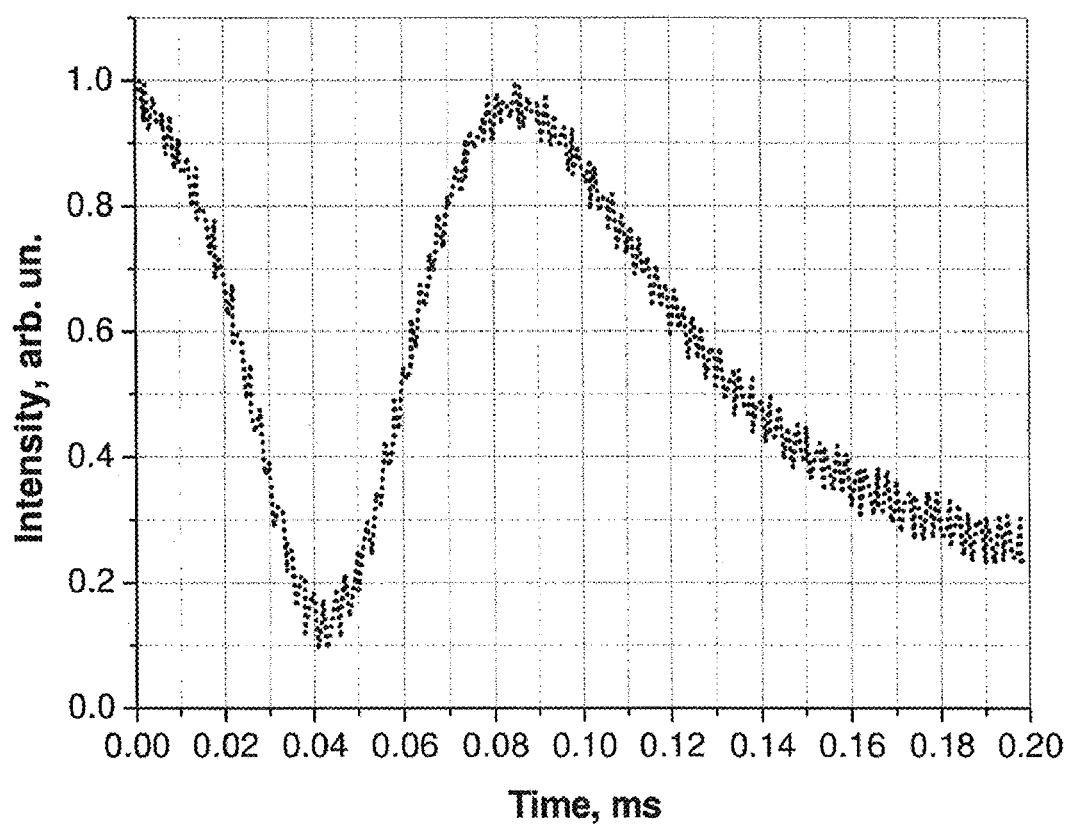
FIG. 23 shows dynamics of the phase shift relaxation after removing 130V applied to the 25 μm thick SLC cell. With the wavelength of the probing light λ=0.632 μm, the cell switches phase retardation of λ/2 within 40 μs and therefore is able to provide light modulation with the frequency of 25 kHz.

FIG. 23 shows the dynamics of the phase shift relaxation after removing 130V applied to the SLC cell. The wavelength of the probing light λ=0.632 μm; the cell switches phase retardation of λ/2 within 40 μs when the electric field is removed (relaxation). The switching ON time was also measured and it was realized that it might be 10 times shorter than the switching OFF time. Therefore this particular cell is able to provide light modulation with the frequency of 25 kHz.

Example 5

SLC Films with Controllable Gradient of the Phase Retardation

Performance of a liquid crystal film is determined by an initial phase retardation pattern created in the film and a way in which the pattern changes during application of an electric field. Here the fast switching properties of the stressed liquid crystals were combined with a gradient of the liquid crystal concentration in the plane of the SLC film.

Gradient of the liquid crystal concentration was imposed during the preparation by the UV irradiation through the mask. The profile of the difference of the phase retardation value in different areas is determined by the optical density profile of the mask and may be varied in a different manner in accordance with a particular application: centrosymmetric, cylindrical, saw-tooth profiled, etc. Those places with higher liquid crystal concentration provide higher value of the phase retardation. Conversely, the areas with a lower liquid crystal concentration would have lower phase retardation. In addition, the difference in the UV intensity may produce the domains of different size in different areas of the cell. All these factors together lead to a different phase retardation shift when a uniform electric field is applied over the entire area of the sample due to different amounts of the liquid crystal in different places of the sample are reoriented.

To demonstrate the described approach, a stressed liquid crystal film was fabricated consisting of E7 and NOA65 in a weight ratio of 86:14 and exposing it with UV light through a linear optical density filter. First, the phase separation was performed by polymerizing the film with UV light at the temperature of 110° C. for a half of hour followed by a room temperature post cure for another 30 min. After polymerization mechanical shear was applied.

The polymer network structures at different positions of the cell were characterized by scanning electron microscopy. It was observed that the region exposed to stronger UV intensity has a higher polymer concentration than the regions exposed to lower intensity. Also, the morphology of the polymer network changes a polymer-ball-like structure in the high intensity regions to thin polymer-sheet-like structures exposed to lower intensity.

Figure 24:
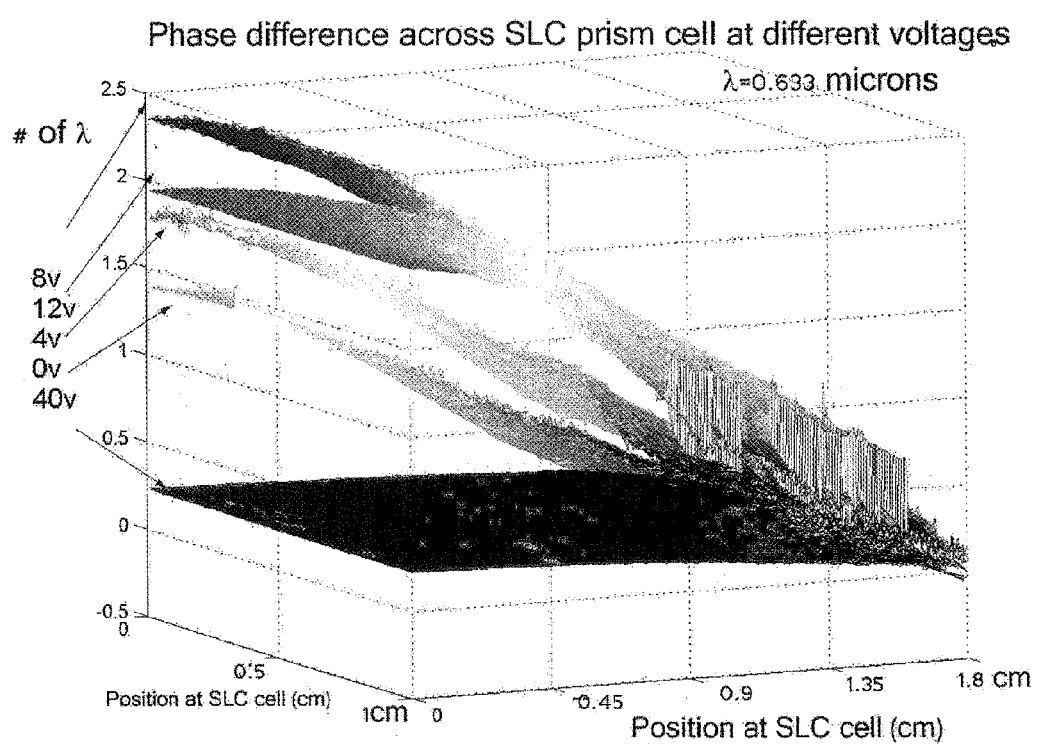
FIG. 24 shows the gradient of the phase retardation in the specially designed SLC cell; 2D phase retardation distribution changes as a function of an applied voltage.
Figure 25:
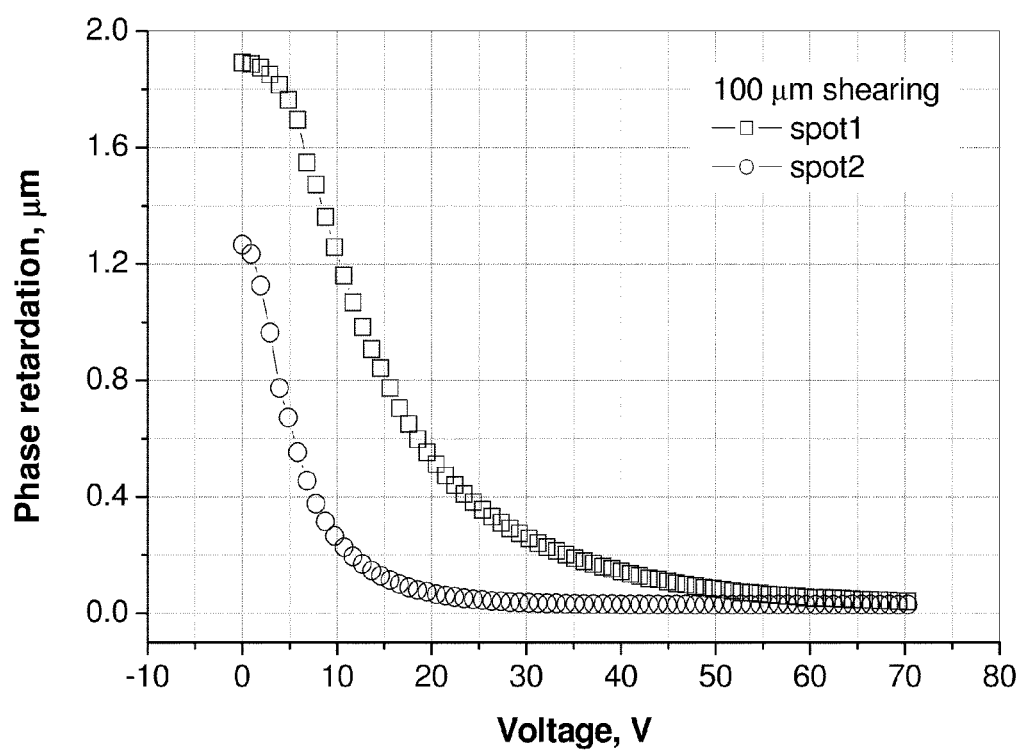
FIG. 25 shows phase retardation distribution changes from 0.035 μm per 1 mm of the cell's length at no applied voltage to zero when the applied voltage approaches 60 V.

FIG. 24 shows 2D phase retardation distribution as a function of an applied voltage. This distribution changes from 0.035 μm per 1 mm of the cell's length at no applied voltage to zero when the applied voltage approaches 60 V (FIG. 25). Shearing not only reduced light scattering of the cell, sped up the response time, but it also enhanced the phase retardation gradient. By adjusting a single applied voltage it was possible to electronically control the optics of the refractive index prism without complicated electrode patterns or electronics.

If an inhomogeneous centrosymmetric mask for the UV irradiation was used, a switchable lens would be obtained. The focal length is related to the lens radius r, wavelength 2, and phase difference Δδ as: F=πr$^2$/λΔδ. In our experiment, r=18 mm, λ=0.632 μm, and Δδ=2π. Thus the calculated effective focal length is around 180 m at no applied voltage and may be switched to infinity with the applied 60 V.

Depending on the liquid crystal gradient, a liquid crystal lens with focus movable off as well as along the axis or switchable beam deflector may be realized. In addition, these new prismatic SLCs can be used to make electronically controlled tunable prisms and gratings, microlens arrays, and also other possible phase modulators simply by designing variable patterned photomasks. The resulting devices can be addressed using a single electrode and single applied voltage. This approach is much simpler than using complicated electrode patterns and complex drive schemes.

Liquid crystal based beam steering devices that use a continuous gradient in the index of refraction can be used to steer light to an angle α defined by sin α=Δn d/w, where Δn is the maximum value of the linear change in the index of refraction along the aperture of width w and material thickness d. Generally the index of refraction referred to is the effective extraordinary index of refraction defined as $$n_e^{\textit{eff}} = \sqrt{\frac{n_e^2 n_o^2}{n_o^2 \sin^2 q + n_e^2 \cos^2 q}},$$

where q is the angle between the director and the light propagation direction. It is considered that the steered beam of light is polarized so as only to excite the extraordinary mode. The gradient in the value of the index of refraction is typically created by using patterned electrodes to create a gradient in the electric field strength along the aperture that causes a gradient in the orientation of the liquid crystal director, and the resulting value of the extraordinary index of refraction as related to the equation above. A problem is that as the aperture becomes large, a large steering angle α requires a large material thickness d. A common solution to this problem (that can be applied if monochromatic light of wavelength λ is used), is to reset the Δn value when Δnd/λ, is an integer. In a liquid crystal device this can be implemented by providing resets in the gradient of the electric field that is created by the electrode structure of the device. However this solution has another problem, in that it is difficult to create abrupt changes in the electric field strength along the aperture. Having a patterned electrode structure on the surfaces of the material of thickness d can create a desired abrupt change in the voltage applied to the material, but the abrupt change in potential is not maintained through the thickness of the material due to "fringing fields". Therefore the "fringing fields" prevent an abrupt change in the index of refraction needed to provide resets in the gradient of the index of refraction so that a large aperture, large angle beam steering device can be realized. The method of providing a linear change in the index of refraction described in example 4 does not require a patterned electrode structure and does not suffer from the problems of "fringing fields". The abrupt change in the index of refraction for resets is provided by the polymer network that is constructed through the use of highly collimated light that has a much lower degree of spreading that the electric field strength of the patterned electrode approach.

While the present invention has been described in conjunction with preferred embodiments thereof, it is evident that many alternatives, modifications and variations will be apparent to those skilled in the art. Accordingly, it is intended to embrace all such alternatives, modifications and variations that fall within the spirit and scope thereof as set forth in the appended claims.

What is claimed is:

1. A method for preparing a liquid crystal light modulating cell, the method comprising the steps of:
    mixing a liquid crystal material and at least one polymerizable material to form a pre-polymerizing solution;
    providing a pair of spaced apart substrates to receive the pre-polymerizing solution;
    disposing the pre-polymerizing solution between the spaced apart substrates;
    phase-separating the pre-polymerizing solution with ultraviolet radiation at a temperature in a range from about 5° C. to about 50° C. greater than a nematic-isotropic transition temperature of the liquid crystal material to form a polymer structure of interpenetrating polymer chains and interconnected unidirectionally oriented microdomains of the liquid crystal material which extend between the surfaces of the substrates; and
    applying a force to the film to change the shape of the microdomains to a prolonged shape, wherein the liquid crystal material is anchored with the polymer chains to orient the liquid crystal material in each of the microdomains in a direction thereby adjusting the electro-optical properties of the liquid crystal material including optical transparency.

2. The method of claim 1, wherein each of the substrates has at least one electrode disposed thereon.

3. The method of claim 2, further comprising:
    connecting a power supply to each of the electrodes such that application of an electric field by the power supply adjusts the orientation of at least some of the liquid crystal directors and causes a change of the phase retardation of the film.

4. The method of claim 3, further comprising:
    controlling an amount of force applied to the film to control the amount of the phase shift.

5. The method of claim 2, wherein at least one of the spaced apart substrates is transparent.

6. The method of claim 5, wherein one of the pair of spaced apart substrates is opposed by a reflective substrate.

7. The method of claim 1, wherein the applied force substantially eliminates the hysteresis of the cell.

8. The method of claim 3, wherein at least one of the substrates has a plurality of parallel electrodes.

9. The method of claim 4, wherein a linear dependence of the phase shift versus applied electric field is obtained by adjusting the amount of force applied to the film.

10. The method of claim 4, wherein hysteresis of the film is controlled by adjusting the amount of force applied to the film.

11. The method of claim 3, further comprising:
    preparing the film with a gradient of the phase shift in which the magnitude of the gradient and its space distribution is determined by an optical density filter.

12. The method of claim 1, wherein substantially all of the liquid crystal areas are oriented in a single direction from the force applied to the light modulating material.

13. The method of claim 1, wherein the force is applied by shearing at least one of the substrates relative to the other substrate.

14. The method of claim 1, wherein the force is applied by stretching the film in a linear direction.

15. The method of claim 1, wherein the liquid crystal material is selected from the group consisting of nematic liquid crystals, cholesteric liquid crystals, and smectic liquid crystals.

16. The method of claim 1, wherein the phase-separating step is conducted at a temperature about 10-30° C. above the nematic-isotropic transition temperature of the liquid crystal material.

17. The method of claim 13, wherein the shearing distance is greater than or equal to about 50 µm.

18. The method of claim 13, wherein the shearing distance is greater than or equal to about 80 µm.

19. The method of claim 1, wherein the ultraviolet radiation is passed through a mask resulting in the formation of a plurality of network polymer domains at positions throughout the liquid crystal material.

20. The method of claim 19, wherein the mask is an optical density filter.

21. The method of claim 19, wherein the mask has a shape selected from the group consisting of centrosymmetric, cylindrical, and saw-tooth profiled.

22. The method of claim 19, wherein the polymer concentration and the shape of the polymer network domains are dependent upon the amount of ultraviolet radiation passed through the mask and exposed to the pre-polymerizing solution.

23. The method of claim 19, wherein the polymer network domains exposed to a stronger intensity of ultraviolet radiation result in a higher polymer concentration.

24. The method of claim 19, wherein the polymer network domains exposed to a lower intensity of ultraviolet radiation result in a lower polymer concentration.

25. A method of preparing a liquid crystal light modulating cell, the method comprising the steps of:
    providing a pair of separated substrates, at least one electrode disposed on a surface of each substrate and facing one another, and a light modulating material disposed between the substrates, wherein the light modulating material includes a liquid crystal material and at least one polymerizable material that is mixed to form a pre-polymerizing solution;
    phase separating the pre-polymerizing solution by exposing the pre-polymerizing solution to an intensity of ultraviolet radiation at a temperature in a range from about 5° C. to about 50° C. greater than a nematic-isotropic transition temperature of the liquid crystal material, wherein the ultraviolet radiation is passed through a mask resulting in the formation of a plurality of polymer network domains at positions throughout the liquid crystal material;

applying a force to a film of the phase-separated pre-polymerizing solution to deform the polymer network domains and orient the liquid crystal material resulting in the adjustment of the electro-optical properties of the liquid crystal material including its optical transparency;

connecting a power supply to each of the electrodes such that application of an electric field by the power supply adjusts the orientation of at least some of the liquid crystal director and causes a corresponding phase shift of any light impinging upon the film.

26. The method of claim 1, further comprising:

cooling the pre-polymerizing solution to a temperature below the nematic-isotropic transition temperature while continuing the phase-separation of the pre-polymerizing solution by continued irradiation by ultraviolet radiation to form strengthened polymer domains interspersed with the liquid crystal material, wherein directors of the liquid crystal material are randomly oriented.

* * * * *